(12) United States Patent
Ooba

(10) Patent No.: US 10,710,582 B2
(45) Date of Patent: Jul. 14, 2020

(54) ELECTRIC POWER STEERING DEVICE

(71) Applicant: NSK Ltd., Shinagawa-ku, Tokyo (JP)

(72) Inventor: Masaya Ooba, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/545,597

(22) PCT Filed: Jun. 8, 2016

(86) PCT No.: PCT/JP2016/067015
§ 371 (c)(1),
(2) Date: Jul. 21, 2017

(87) PCT Pub. No.: WO2016/199799
PCT Pub. Date: Dec. 15, 2016

(65) Prior Publication Data
US 2018/0009437 A1 Jan. 11, 2018

(30) Foreign Application Priority Data
Jun. 11, 2015 (JP) ................................ 2015-118504

(51) Int. Cl.
*B60W 30/10* (2006.01)
*B62D 1/02* (2006.01)
(Continued)

(52) U.S. Cl.
CPC ............ *B60W 30/10* (2013.01); *B60W 40/10* (2013.01); *B62D 1/02* (2013.01); *B62D 5/0463* (2013.01);
(Continued)

(58) Field of Classification Search
None
See application file for complete search history.

(56) References Cited

U.S. PATENT DOCUMENTS 7,753,162 B2 7/2010 Shiozawa et al.
8,094,001 B2 1/2012 Murphy et al.
(Continued)

FOREIGN PATENT DOCUMENTS

DE 10 2013 015 348 A1 4/2014
EP 2 008 915 A2 12/2008
(Continued)

OTHER PUBLICATIONS

International Search Report (PCT/ISA/210) issued in PCT Application No. PCT/JP2016/067015 dated Aug. 9, 2016 with English translation (5 pages).
(Continued)

*Primary Examiner* — Christian Chace
*Assistant Examiner* — Michael F Whalen
(74) *Attorney, Agent, or Firm* — Crowell & Moring LLP

(57) ABSTRACT

An electric power steering device includes: a steering torque sensor that detects a steering torque; a current command value calculation unit that calculates a current command value based on the steering torque; an electric motor that generates a steering assist torque; a motor control unit that controls and drives the electric motor based on the current command value; a navigation controller and a GPS receiver that detects position information of a vehicle; and an operation assist unit that stores, in a map database, the steering torque detected by the steering torque sensor and the position information of the vehicle upon detection of the steering torque in association with each other and executes operation assist processing for assisting the driver in operating the steering wheel based on a past steering torque corresponding to current position information.

7 Claims, 11 Drawing Sheets

(51) Int. Cl.
  *B62D 15/02*   (2006.01)
  *B62D 6/00*    (2006.01)
  *B60W 40/10*   (2012.01)
  *B62D 5/04*    (2006.01)
(52) U.S. Cl.
  CPC ............ *B62D 6/00* (2013.01); *B62D 15/025* (2013.01); *B60W 2540/18* (2013.01); *B60W 2710/202* (2013.01)

(56) References Cited

U.S. PATENT DOCUMENTS

| | | | |
|---|---|---|---|
| 9,227,635 B1* | 1/2016 | Takamatsu | B62D 5/0466 |
| 2007/0029129 A1 | 2/2007 | Shiozawa et al. | |
| 2009/0005929 A1 | 1/2009 | Nakao et al. | |
| 2010/0168998 A1 | 7/2010 | Matsunaga | |
| 2013/0032421 A1* | 2/2013 | Bonne | B62D 15/0285 |
| | | | 180/204 |
| 2016/0052544 A1* | 2/2016 | Ueda | B62D 15/025 |
| | | | 701/25 |
| 2016/0090084 A1* | 3/2016 | Takamatsu | B60W 50/0098 |
| | | | 701/1 |
| 2016/0159366 A1 | 6/2016 | Tsuyunashi et al. | |
| 2017/0016737 A1 | 1/2017 | Takahara | |
| 2017/0088168 A1* | 3/2017 | Oyama | B62D 5/0463 |
| 2017/0137033 A1* | 5/2017 | Habu | B60W 30/09 |
| 2017/0267286 A1* | 9/2017 | Takamatsu | B62D 15/025 |
| 2017/0297567 A1* | 10/2017 | Matsumura | B60W 30/08 |
| 2018/0134290 A1* | 5/2018 | Kataoka | B62D 15/025 |
| 2018/0181123 A1* | 6/2018 | Bauer | B62D 15/025 |
| 2019/0061808 A1* | 2/2019 | Mizoguchi | B60W 30/12 |
| 2019/0080609 A1* | 3/2019 | Mizoguchi | G08G 1/166 |

FOREIGN PATENT DOCUMENTS

| | | |
|---|---|---|
| EP | 2 842 833 A2 | 3/2015 |
| JP | 2005-98749 A | 4/2005 |
| JP | 2007-62712 A | 3/2007 |
| JP | 2008-120288 A | 5/2008 |
| JP | 2009-40092 A | 2/2009 |
| JP | 2009-241884 A | 10/2009 |
| JP | 4494162 B2 | 6/2010 |
| JP | 2010-155547 A | 7/2010 |
| JP | 4762528 B2 | 8/2011 |
| JP | 2012-224247 A | 11/2012 |
| JP | 2015-217737 A | 12/2015 |
| JP | 2016-88333 A | 5/2016 |
| JP | 2016-110449 A | 6/2016 |
| WO | WO 2007/115775 A1 | 10/2007 |
| WO | WO 2015/151594 A1 | 10/2015 |
| WO | WO-2016199799 A1 * | 12/2016 ............... B62D 6/00 |

OTHER PUBLICATIONS

Japanese-language Written Opinion (PCT/ISA/237) issued in PCT Application No. PCT/JP2016/067015 dated Aug. 9, 2016 (3 pages).
English translation of Japanese-language Office Action issued in counterpart Japanese Application No. 2016-566839 dated Jan. 4, 2017(4 pages).
English translation of Japanese-language Office Action issued in counterpart Japanese Application No. 2016-566839 dated Mar. 7, 2017(3 pages).
English translation of Japanese-language Office Action issued in counterpart Japanese Application No. 2016-566839 dated May 9, 2017(3 pages).
International Preliminary Report on Patentability (PCT/IB/338 & PCT/IB/373) issued in PCT Application No. PCT/JP2016/067015 dated Dec. 21, 2017, including English translation of document C2 (Japanese-language Written Opinion (PCT/ISA/237)) previously filed on Jul. 21, 2017 (six pages).
Chinese Office Action issued in Chinese counterpart application No. 201680033747.4 dated Jul. 9, 2018, with partial English translation (Five (5) pages).
Extended European Search Report issued in European counterpart application No. 16807505.9-1013 / 3257727 dated Oct. 22, 2018 (Twelve (12) pages).
Chinese Office Action issued in Chinese counterpart application No. 201680033747.4 dated Nov. 15, 2018, with partial English translation (Nine (9) pages).
European Office Action issued in European counterpart application No. 16 807 505.9-1013 dated Jul. 29, 2019 (Five (5) pages).

* cited by examiner

ELECTRIC POWER STEERING DEVICE

TECHNICAL FIELD

The present invention relates to an electric power steering device.

BACKGROUND ART

Conventionally, techniques disclosed in PTLs 1 and 2, for example, are available as techniques for performing steering assistance during vehicle traveling by controlling an electric power steering device. With these techniques, steering assist control is performed by controlling an electric power steering device on the basis of curve information from a navigation device.

CITATION LIST

Patent Literature

PTL 1: JP 4762528 B
PTL 2: JP 4494162 B

SUMMARY OF INVENTION

Technical Problem

However, the conventional techniques of PTLs 1 and 2 are designed to execute steering assist control by the passive operation of the electric power steering device, and are not designed to actively execute steering assist control by the electric power steering device. Therefore, these techniques have room for improvements in terms of actively operating the electric power steering device.

More specifically, it is an object of the present invention to provide an electric power steering device which can provide appropriate steering assistance to a driver by active steering assistance using past steering operation information.

Solution to Problem

In order to achieve the above object, according to an aspect of the present invention, there is provided an electric power steering device including: a current command value calculation unit configured to calculate a current command value on the basis of at least a steering torque input to a steering mechanism; an electric motor configured to generate a steering assist torque to be applied to a steering shaft of the steering mechanism; a motor control unit configured to control and drive the electric motor on the basis of the current command value; a steering operation information detection unit configured to detect steering operation information as information concerning an operation of a steering wheel by a driver; a position information acquisition unit configured to acquire position information of a vehicle equipped with the electric power steering device; an operation information storage unit configured to store, in a storage device, steering operation state information obtained by associating the steering operation information detected by the steering operation information detection unit with the position information upon detection of the steering operation information; and an operation assist unit configured to execute operation assist processing for assisting the driver in operating the steering wheel on the basis of past steering operation state information which is the steering operation state information which has already been stored by the operation information storage unit and corresponds to current position information which is the position information acquired currently.

Advantageous Effects of Invention

According to the present invention, it is possible to store steering operation state information obtained by associating position information of the vehicle and operation information of the steering wheel with each other and to aid the driver in the current operation of the steering wheel on the basis of the stored past steering operation state information. This can provide appropriate steering assistance to the driver by actively performing operation assistance by the electric power steering device.

DESCRIPTION OF EMBODIMENTS

Figure 1:
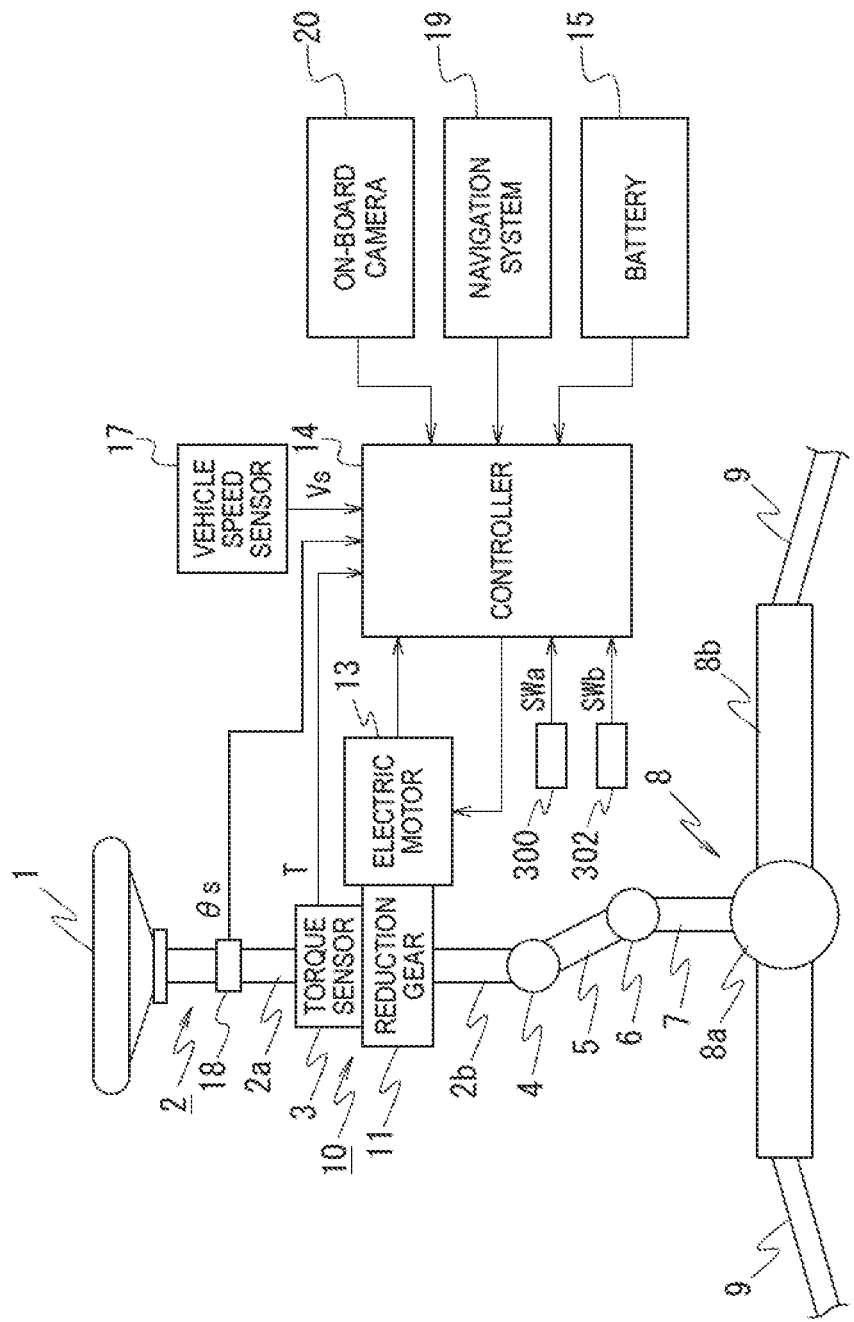
FIG. 1 is a view illustrating the configuration of an entire electric power steering device according to the present invention.

First to third embodiments of the present invention will be described below with reference to the drawings. In the following drawings, the same or similar reference numerals denote the same or similar parts. However, it should be noted that the drawings are schematic and have dimensions, ratios, and the like different from the actual ones.

The following embodiments exemplify devices or methods for embodying the technical idea of the present invention, and the technical idea of the present invention does not limit, for example, the materials, shapes, structures, and arrangements of components to the following specific examples. Various changes can be made to the technical idea of the present invention within the technical scope defined by claims described in the scope of claims.

First Embodiment (Configuration)

An electric power steering device according to a first embodiment is mounted in a vehicle and includes, as a steering mechanism, a steering wheel 1, a steering shaft 2, a steering torque sensor 3, and a universal joint 4, as illustrated in FIG. 1. The device further includes an intermediate shaft 5, a universal joint 6, a pinion shaft 7, a steering gear 8, and tie rods 9.

A steering force generated as the driver operates the steering wheel 1 is transmitted to the steering shaft 2. The steering shaft 2 includes an input shaft 2a and an output shaft 2b, and the input shaft 2a has its one end connected to the steering wheel 1 and its other end connected to one end of the output shaft 2b via the steering torque sensor 3, as illustrated in FIG. 1.

The steering force transmitted to the output shaft 2b is transmitted to the intermediate shaft 5 via the universal joint 4 and further to the pinion shaft 7 via the universal joint 6. The steering force transmitted to the pinion shaft 7 is transmitted to the tie rods 9 via the steering gear 8 to turn a steered wheel (not illustrated). The steering gear 8 employs a rack-and-pinion system including a pinion 8a connected to the pinion shaft 7 and a rack 8b which meshes with the pinion 8a, and converts a rotational motion transmitted to the pinion 8a into a rectilinear motion in the rack 8b.

A steering assist mechanism 10 which transmits a steering assist force to the output shaft 2b is connected to the output shaft 2b of the steering shaft 2. The steering assist mechanism 10 includes a reduction gear 11 connected to the output shaft 2b, and an electric motor 13 which is connected to the reduction gear 11 and generates a steering assist force for a steering system.

The steering torque sensor 3 is used to detect a steering torque applied to the steering wheel 1 and transmitted to the input shaft 2a. In the first embodiment, the steering torque sensor 3 is configured to convert a steering torque into a torsional angular displacement of a torsion bar (not illustrated) interposed between the input shaft 2a and the output shaft 2b, detect the torsional angular displacement as a magnetic signal, and convert it into an electrical signal.

The electric power steering device further includes a controller 14 and a steering angle sensor 18. Although the device includes the steering angle sensor 18 to support Modifications, a steering angle θs detected by the steering angle sensor 18 is not used in processing according to the present invention in the first embodiment. Hence, the electric power steering device in the first embodiment may not include the steering angle sensor 18.

The controller 14 is actuated by power supply from a battery 15 serving as an on-board battery.

A steering torque T detected by the steering torque sensor 3 and a vehicle speed Vs detected by a vehicle speed sensor 17 are input to the controller 14. Steering assist control (steering assistance) for applying a steering assist force corresponding to the steering torque T and the vehicle speed Vs to the steering system is performed. More specifically, a steering assist command value (steering assist torque command value) for generating the steering assist force in the electric motor 13 is calculated in accordance with a known procedure, and a current command value for the electric motor 13 is calculated on the basis of the calculated steering assist command value. Feedback control of a driving current supplied to the electric motor 13 is performed using the calculated current command value and the motor current detection value.

The controller 14 is connected to a navigation system 19 mounted in the vehicle, an on-board camera 20 mounted on the front (for example, the portion above the rearview mirror) of the vehicle, an SC steering assist switch 300, and a lane keeping assist switch 302, via an in-vehicle network such as a CAN (Controller Area Network).

Various types of information (details will be described later) from the navigation system 19 and image information (details will be described later) from the on-board camera 20 are input to the controller 14. A first switch signal SWa indicating switch ON/OFF from the SC steering assist switch 300 and a second switch signal SWb indicating switch ON/OFF from the lane keeping assist switch 302 are further input to the controller 14.

The controller 14 executes operation assist processing for assisting the driver in operating the steering wheel 1 on the basis of steering operation information that is information concerning the operation of the steering wheel 1 by the driver in the path in which the vehicle has travelled in the past, in cooperation with the navigation system 19 when the SC steering assist switch 300 is ON.

In the first embodiment, the controller 14 further executes operation assist processing for allowing the vehicle to travel while keeping the lane on the basis of the above-mentioned steering operation information and image information of the view in front of the vehicle acquired from the on-board camera 20, when both the SC steering assist switch 300 and the lane keeping assist switch 302 are ON and lane keeping assist control is executable.

The specific configuration of the controller 14 will be described below.

Figure 2:
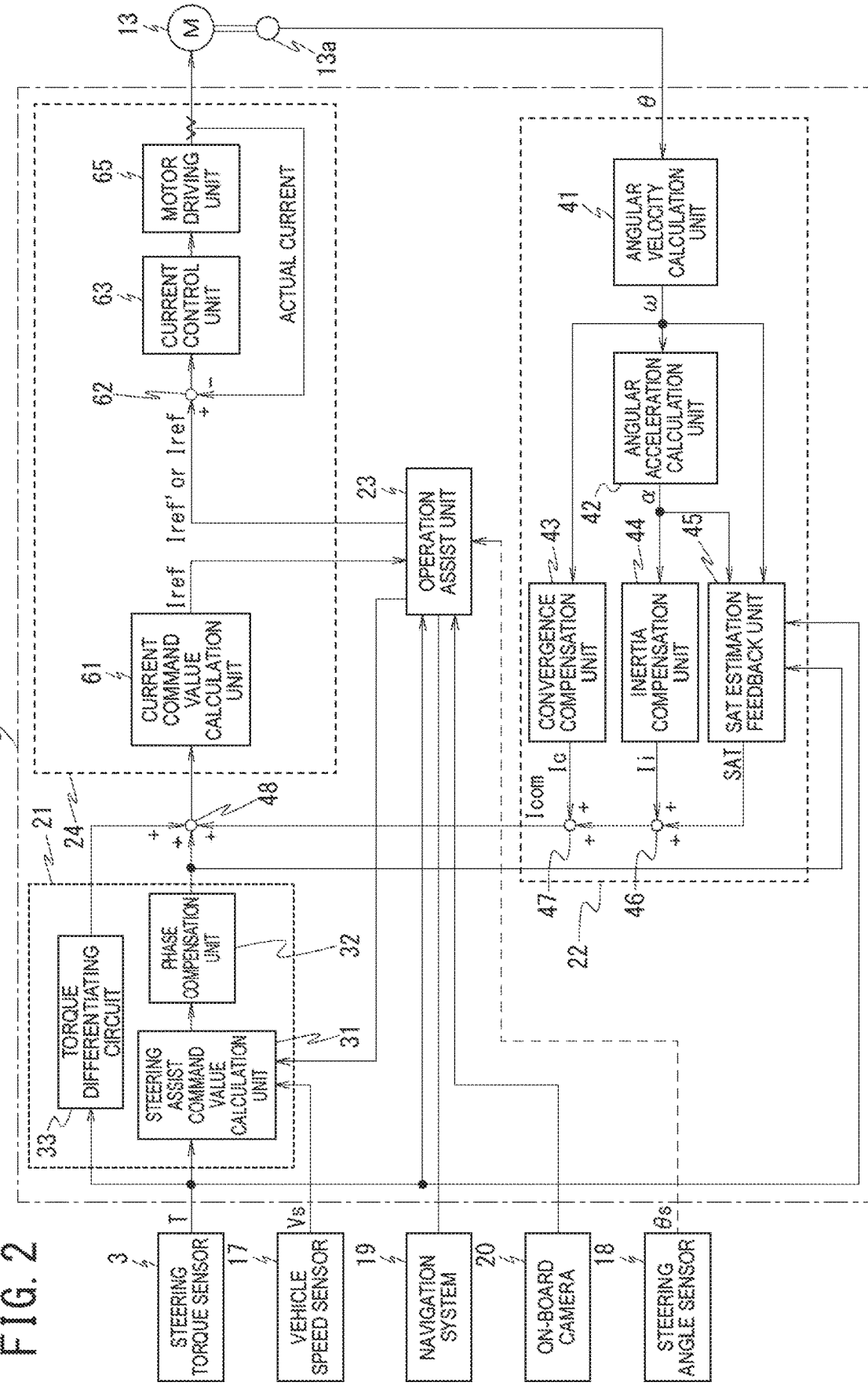
FIG. 2 is a block diagram illustrating the specific configuration of a controller.

The controller 14 includes a command value calculation unit 21 which calculates a steering assist command value (steering assist torque command value) on the basis of the steering torque T and the vehicle speed Vs, and a command value compensation unit 22 which compensates the steering assist command value, as illustrated in FIG. 2. The controller 14 further includes an operation assist unit 23 which executes operation assist processing of the steering wheel 1 on the basis of a past vehicle speed Vs (which may be referred to as a "past (or last) vehicle speed Vsp" hereinafter) and a past steering torque T (which may be referred to as a "past (or last) steering torque Tp" hereinafter) corresponding to current position information of the vehicle. The controller 14 further includes a motor control unit 24 which controls driving of the electric motor 13 on the basis of a current command value from the operation assist unit 23.

The command value calculation unit 21 includes a steering assist command value calculation unit 31, a phase compensation unit 32, and a torque differentiating circuit 33.

The steering assist command value calculation unit 31 calculates a steering assist command value (steering assist torque command value) by referring to a steering assist command value calculation map, on the basis of the steering torque T and the vehicle speed Vs. The steering assist command value calculation map is implemented in a characteristic diagram which represents the steering torque T on the abscissa and the steering assist command value on the ordinate and has the vehicle speed Vs as a parameter. The steering assist command value is set to increase relatively moderately in the beginning with an increase in steering torque T, and then steeply increase with a further increase in steering torque T. The slope of the characteristic curve is set to reduce with an increase in vehicle speed Vs.

The phase compensation unit 32 performs phase compensation for the steering assist command value calculated by the steering assist command value calculation unit 31 and outputs the steering assist command value after phase compensation to an adder 48. Transfer characteristics as given by, for example, $(T1s+1)/(T2s+1)$ are applied to the steering assist command value.

The torque differentiating circuit 33 calculates a compensation value for the steering torque T on the basis of the rate of change in steering torque obtained by differentiating the steering torque T and outputs it to the adder 48.

The command value compensation unit 22 includes at least an angular velocity calculation unit 41, an angular acceleration calculation unit 42, a convergence compensation unit 43, an inertia compensation unit 44, and an SAT estimation feedback unit 45.

The angular velocity calculation unit 41 differentiates the motor angle of rotation θ detected by a rotational angle sensor 13a to calculate a motor angular velocity ω. The angular acceleration calculation unit 42 differentiates the motor angular velocity ω calculated by the angular velocity calculation unit 41 to calculate a motor angular acceleration α.

The convergence compensation unit 43 receives the motor angular velocity ω calculated by the angular velocity calculation unit 41 to calculate a convergence compensation value Ic to brake swaying of the steering wheel 1 to improve the yaw convergence of the vehicle.

The inertia compensation unit 44 calculates an inertia compensation value Ii for compensating for the torque generated by the inertia of the electric motor 13 to prevent degradation in feeling of inertia or control response characteristic.

The SAT estimation feedback unit 45 receives the steering torque T, the motor angular velocity ω, the motor angular acceleration α, and the steering assist command value calculated by the command value calculation unit 21 and estimates and calculates a self-aligning torque SAT on the basis of them.

An adder 46 adds the inertia compensation value Ii calculated by the inertia compensation unit 44 and the self-aligning torque SAT calculated by the SAT estimation feedback unit 45 and outputs the result to an adder 47.

The adder 47 adds the sum obtained by the adder 46 and the convergence compensation value Ic calculated by the convergence compensation unit 43 and outputs the result to the adder 48 as a command compensation value Icom.

The adder 48 adds the compensation value output from the torque differentiating circuit 33 and the command compensation value Icom output from the command value compensation unit 22 to the steering assist command value after phase compensation output from the phase compensation unit 32, and outputs the compensated steering assist command value. The compensated steering assist command value is input to the motor control unit 24.

The specific configuration of the navigation system 19 will be described below.

Figure 3:
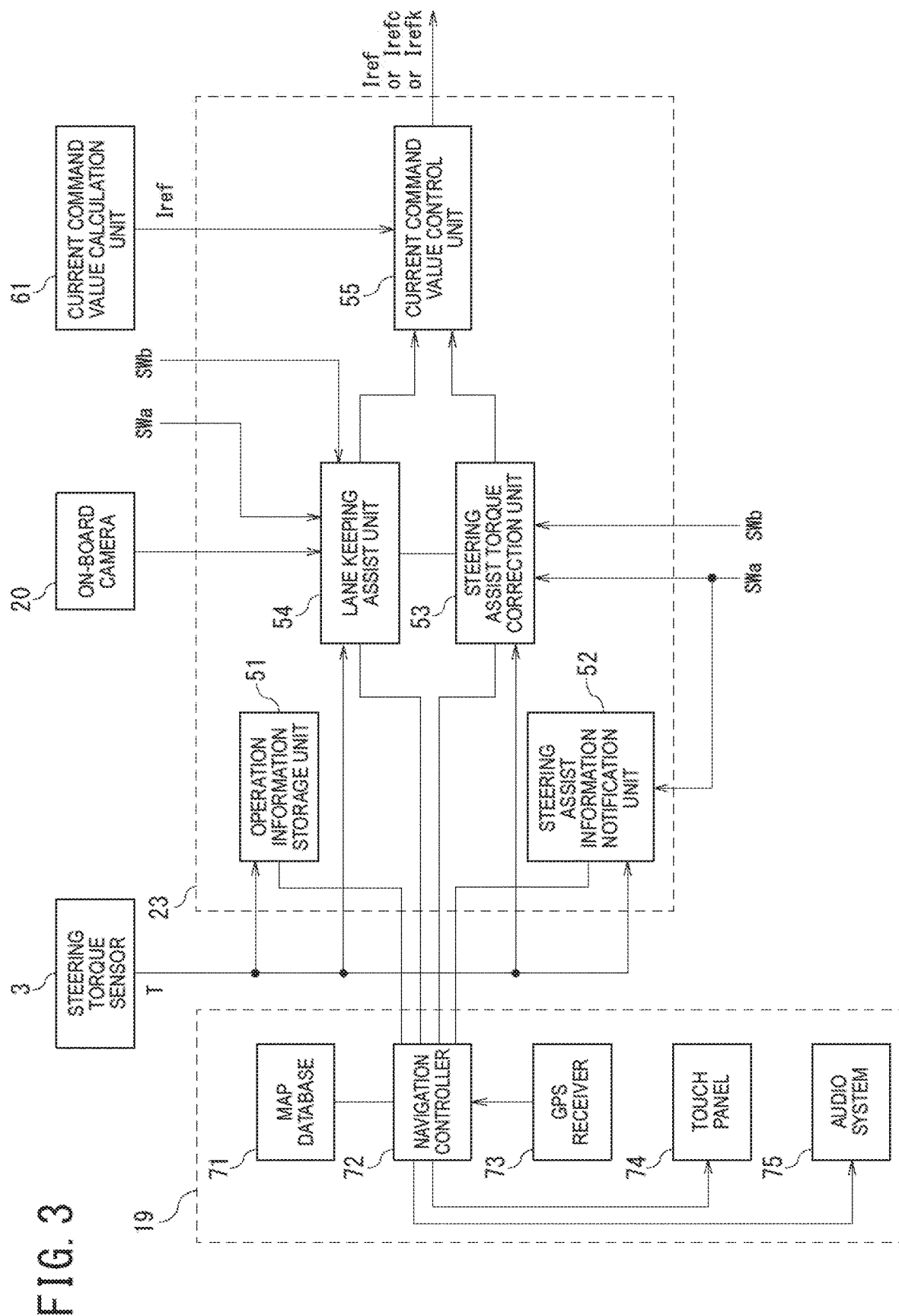
FIG. 3 is a block diagram illustrating the specific configuration of a navigation system and an operation assist unit.

The navigation system 19 includes a map database 71, a navigation controller 72, a GPS receiver 73, a touch panel 74, and an audio system 75, as illustrated in FIG. 3.

The map database 71 is implemented in a mass storage medium such as a hard disk and stores roadmap information for car navigation. In the first embodiment, steering operation information, position information of the vehicle upon acquisition of the steering operation information, and road information corresponding to the position information are stored in a storage area other than the roadmap information in association with each other. Excluding the road information, only such steering operation information and position information may be stored in association with each other. In this case, road information is separately retrieved from the position information.

The navigation controller 72 detects traveling direction information of the vehicle, road shape information in the vicinity of the vehicle, road type information corresponding to the current position, traffic intersection information, and the like as road information on the basis of the current position (latitude and longitude) of the vehicle acquired by the GPS receiver 73 and the roadmap information stored in the map database 71.

In the first embodiment, the navigation controller 72 further executes operation assist processing in cooperation with the controller 14.

More specifically, in accordance with a storage instruction of steering operation state information (to be described later) from the controller 14, processing for storing the steering operation state information from the controller 14 in the map database 71 is executed. Further, in accordance with a notification command of steering assist information from the controller 14, processing for causing the touch panel 74 to display the display information corresponding to operation assistance details on and causing the audio system 75 to output a voice message or a buzzer sound corresponding to operation assistance details is executed.

The steering assist information is information for improving the safety of steering, such as information corresponding to the difference between the past steering operation information corresponding to the current position of the vehicle and the current steering operation information.

The GPS receiver 73 receives a GPS signal from a GPS satellite. Appropriate examples include a superheterodyne receiver which down-converts 1.5-GHz band radio waves into 4-MHz (or 1-MHz) baseband signals using two IFs (Intermediate Frequencies).

The touch panel 74 serves as a display equipped with a touch input device and a liquid crystal panel in combination. The touch panel 74 displays various types of information in accordance with commands from the navigation controller 72 and receives position information on a position within the touch surface of the liquid crystal panel where the user touches to the navigation controller 72. The user inputs various instructions by, for example, touching buttons, texts, or the like displayed on the liquid crystal panel.

The audio system 75 outputs not only a guiding voice for car navigation from its internal loudspeaker, but also a voice message for operation assistance, a voice message or a buzzer sound for danger avoidance, or the like in the first embodiment.

The specific configuration of the operation assist unit 23 will be described below.

The operation assist unit 23 includes an operation information storage unit 51, a steering assist information notification unit 52, a steering assist torque correction unit 53, a lane keeping assist unit 54, and a current command value control unit 55, as illustrated in FIG. 3.

The operation information storage unit 51 acquires a steering torque T input from the steering torque sensor 3, as steering operation information in the first embodiment. At the same timing as acquisition of a steering torque T, the operation information storage unit 51 further acquires a vehicle speed Vs input from the vehicle speed sensor 17 and acquires current position information of the vehicle upon acquisition of the steering torque T and road information corresponding to the current position information from the navigation controller 72 via the in-vehicle network. In the first embodiment, the steering torque T takes a positive value for right steering and a negative value for left steering.

The operation information storage unit 51 generates steering operation state information (which may be referred to as "ST operation state information" hereinafter) obtained by associating the acquired steering torque T, vehicle speed Vs, position information, and road information with one another. The operation information storage unit 51 stores the generated ST operation state information in the map database 71 of the navigation system 19 via the in-vehicle network.

In the first embodiment, information concerning the current position of the vehicle from the navigation controller 72 and road information corresponding to the current position are input to the controller 14 via the in-vehicle network with a preset sampling period. The operation information storage unit 51 acquires information concerning the current position and road information corresponding to the current position to be input, at the same timing as acquisition of a steering torque T (reads them into a RAM (not illustrated) of the controller 14). The same applies to other constituent units.

In the first embodiment, ST operation state information is stored in association with date and time information, and when the vehicle travels on the same road again, two pieces of past ST operation state information for this road, including the current (latest) one, are stored.

In the first embodiment, the steering assist information notification unit 52 executes steering assist information notification instruction processing when the SC steering assist switch 300 is ON, and does not execute steering assist information notification instruction processing when the SC steering assist switch 300 is OFF, on the basis of the first switch signal SWa.

In steering assist information notification instruction processing, the steering assist information notification unit 52 first acquires the current vehicle speed Vs, the steering torque T, and current position information and then acquires the last ST operation state information corresponding to the current position information from the map database 71. The steering assist information notification unit 52 calculates a difference value Td between the current steering torque T and the last steering torque Tp. In the first embodiment, the steering assist information notification unit 52 displays display information corresponding to the information concerning the road on which the vehicle travels and the magnitude of the calculated difference value Td on the touch panel 74 of the navigation system 19. In the first embodiment, the steering assist information notification unit 52 even outputs a voice message or a buzzer sound corresponding to the magnitude of the difference value Td from the audio system 75 of the navigation system 19.

For example, a message corresponding to the difference between the last and current input steering torques is displayed, and a voice message having the same contents as the message is output.

The steering assist information notification unit 52 stores (overwrites) the acquired current vehicle speed Vs, the vehicle speed Vsp included in the acquired ST operation state information, and the calculated difference value Td in a given area of the RAM of the controller 14.

In the first embodiment, display data and audio data for operation information notification are stored in the map database 71 in advance. The present invention is not limited to this configuration, and other configurations may be used, such as a configuration in which such data is stored in a storage device such as the ROM of the controller 14 in advance and transmits the data to the navigation controller 72 as occasion arises, or a configuration in which such data is stored and held in the map database 71 after once the data is transmitted.

The steering assist torque correction unit 53 (which may be referred to as the "steering AT correction unit 53" hereinafter) executes steering assist torque correction processing when the SC steering assist switch 300 is ON and lane keeping assist control is inexecutable, on the basis of the first and second switch signals SWa and SWb and the vehicle speed Vs. More specifically, lane keeping assist control is executable when, for example, the lane keeping assist switch 302 is ON and the vehicle speed Vs has been set to that (65 km/h or more) at which lane keeping assist control is executable.

Steering assist torque correction processing (which may be referred to as "steering AT correction processing" hereinafter) is not executed when the SC steering assist switch 300 is OFF. In this case, the steering AT correction unit 53 outputs information indicating "without correction" to the current command value control unit 55. The steering AT correction unit 53 also outputs information indicating "without correction" to the current command value control unit 55 when the lane keeping assist switch 302 is ON and lane keeping assist control is executable, even if the SC steering assist switch 300 is ON.

In steering AT correction processing, the steering AT correction unit 53 first acquires the vehicle speeds Vs and Vsp and the difference value Td stored in the RAM of the controller 14. When the current steering torque T is determined to be higher than the past steering torque Tp on the basis of the acquired difference value Td, the steering AT correction unit 53 outputs an AT decreasing command to the current command value control unit 55 as a command to correct by decreasing the normal steering assist torque based on the current vehicle speed Vs and steering torque T.

More specifically, the steering AT correction unit 53 calculates an amount of decreasing correction for an AT decreasing command on the basis of the current vehicle speed Vs and the past vehicle speed Vsp included in the ST operation state information. This amount of decreasing correction is, for example, smaller as the current vehicle speed Vs exceeds the past vehicle speed Vsp more, and larger as the current vehicle speed Vs falls below the past vehicle speed Vsp more.

When the current steering torque T is lower than the past steering torque Tp, the steering AT correction unit 53 outputs an AT increasing command to the current command value control unit 55 as a command to correct by increasing the normal steering assist torque based on the current vehicle speed Vs and steering torque T. More specifically, the steering AT correction unit 53 calculates an amount of increasing correction for an AT increasing command on the basis of the current vehicle speed Vs and the past vehicle speed Vsp included in the ST operation state information. This amount of increasing correction is, for example, larger as the current vehicle speed Vs exceeds the past vehicle speed Vsp more, and smaller as the current vehicle speed Vs falls below the past vehicle speed Vsp more.

When the current steering torque T takes a value equal to and nearly equal to the past steering torque Tp (a value that falls within a preset tolerance), the steering AT correction unit 53 outputs information indicating "without correction" to the current command value control unit 55.

The lane keeping assist unit 54 executes first lane keeping assist processing when the SC steering assist switch 300 is OFF and lane keeping assist control is executable, on the basis of the first and second switch signals SWa and SWb and the vehicle speed Vs. The lane keeping assist unit 54 executes second lane keeping assist processing when the SC steering assist switch 300 is ON and lane keeping assist control is executable. The lane keeping assist unit 54 does not execute lane keeping assist processing when the lane keeping assist switch 302 is OFF or when the vehicle speed Vs is a speed at which lane keeping assist control is inexecutable.

In first lane keeping assist processing, the lane keeping assist unit 54 first determines the state of the road surface from an image of the view in front of the vehicle from the on-board camera 20. The lane keeping assist unit 54 detects position information in the travel lane in which the vehicle travels and, in turn, detects a lateral displacement X from the center of the travel lane on the basis of the detected position information.

The lateral displacement X includes herein a left displacement XL that is a leftward displacement from the center of the travel lane and a right displacement XR that is a rightward displacement from this center. In the first embodiment, the right displacement XR takes a positive value and the left displacement XL takes a negative value.

The on-board camera 20 in the first embodiment is configured to capture an image of the road surface in front of the vehicle, including lane markings, as an image of the view in front of the vehicle.

The lane keeping assist unit 54 compares the right displacement XR with a preset right displacement threshold XRt (positive value), and calculates a lane keeping current command value Irefk as a current command value for generating a steering assist torque in the direction to cancel out the right displacement when the right displacement XR is equal to or larger than the right displacement threshold XRt. The lane keeping assist unit 54 compares the left displacement XL with a preset left displacement threshold XLt (negative value), and calculates a lane keeping current command value Irefk for generating a steering assist torque in the direction to cancel out the left displacement when the left displacement XL is equal to or smaller than the left displacement threshold XLt.

The lane keeping assist unit 54 outputs the calculated lane keeping current command value Irefk to the current command value control unit 55.

The lane keeping assist unit 54 displays a message notifying that the vehicle tends to depart from its lane on the touch panel 74 of the navigation system 19. The lane keeping assist unit 54 even causes the audio system 75 of the navigation system 19 to output a voice message having the same content as that of the displayed message or a buzzer sound.

The lane keeping assist unit 54 outputs information indicating "without assistance" to the current command value control unit 55 when the right displacement XR is smaller than the right displacement threshold XRt and the left displacement XL is larger than the left displacement threshold XLt.

The lane keeping assist unit 54 also outputs information indicating "without assistance" to the current command value control unit 55 while lane keeping assist processing is not executed.

In second lane keeping assist processing, the lane keeping assist unit 54 first acquires a steering torque T input from the steering torque sensor 3 and current position information of the vehicle. The lane keeping assist unit 54 further acquires current position information and past ST operation state information corresponding to the road position within a predetermined distance from the current position, stored in the map database 71, from the navigation controller 72.

The right displacement threshold XRt or the left displacement threshold XLt is set on the basis of the information of the past steering torque Tp. When, for example, a great change in torque has taken place in the past, a threshold is set by correcting the threshold for an appropriate one of the right displacement threshold XRt or the left displacement threshold XLt to a value smaller than normal (small absolute value). A normal value is set to the threshold for the other one.

Except for the use of the set right displacement threshold XRt or left displacement threshold XLt, the same processing as the above-mentioned first lane keeping assist processing is executed henceforth.

More specifically, the lane keeping assist unit 54 executes the same processing as the above-mentioned first lane keeping assist processing using the normal right displacement threshold XRt or left displacement threshold XLt when no great change in torque takes place.

The lane keeping assist unit 54 also outputs information indicating "without assistance" to the current command value control unit 55 when the right displacement XR is smaller than the corrected right displacement threshold XRt or the left displacement XL is larger than the corrected left displacement threshold XLt, even if a great change in torque has taken place in the past.

When the current command value control unit 55 receives an AT increasing command from the steering AT correction unit 53, it corrects by increasing the current command value Iref input from a current command value calculation unit 61 (to be described later) by the amount of increasing correction indicated by the AT increasing command to calculate a corrected current command value Irefc. When the current command value control unit 55 receives an AT decreasing command from the steering AT correction unit 53, it corrects by decreasing the current command value Iref input from the current command value calculation unit 61 by the amount of decreasing correction indicated by the AT decreasing command to calculate a corrected current command value Irefc. The current command value control unit 55 outputs the calculated, corrected current command value Irefc to a subtracter 62 (to be described later).

When the current command value control unit 55 receives a lane keeping current command value Irefk from the lane keeping assist unit 54, it outputs the lane keeping current command value Irefk to the subtracter 62 in place of a current command value Iref input from the current command value calculation unit 61 (to be described later).

When the current command value control unit 55 receives information indicating "without correction" and information indicating "without assistance" from the steering AT correction unit 53 and the lane keeping assist unit 54, it directly outputs a current command value Iref input from the current command value calculation unit 61 (to be described later) to the subtracter 62.

Referring back to FIG. 2, the motor control unit 24 includes a current detector 60 which detects the actual current of the electric motor 13, a current command value calculation unit 61, a subtracter 62, a current control unit 63, and a motor driving unit 65.

The current command value calculation unit 61 calculates a current command value Iref for the electric motor 13 from a steering assist command value (steering assist torque command value) output from the adder 48. The current command value calculation unit 61 outputs the calculated current command value Iref to the current command value control unit 55 of the operation assist unit 23.

The subtracter 62 calculates a current deviation between any one of the current command value Iref, the corrected current command value Irefc, and the lane keeping current command value Irefk which are input from the current command value control unit 55 and the motor current detection value (actual current value It) detected by the current detector 60, and outputs the current deviation to the current control unit 63.

The current control unit 63 performs feedback control for executing a PI (Proportional Integral) operation with respect to the current deviation and outputting a voltage command value. In other words, the current control unit 63 outputs a voltage command value calculated such that the current deviation becomes zero to the motor driving unit 65.

The motor driving unit 65 includes an inverter circuit (not illustrated) for supplying a driving current to the electric motor 13. The motor driving unit 65 executes duty calculation on the basis of the voltage command value output from the current control unit 63 to calculate a duty ratio as a driving command for the electric motor 13. The motor driving unit 65 drives the inverter circuit on the basis of the calculated duty ratio to control and drive the electric motor 13. In other words, the motor driving unit 65 supplies the driving current controlled using the duty ratio to the electric motor 13.

(Operation Assist Processing)

Operation assist processing executed by the operation assist unit 23 will be described below with reference to FIG. 4. The operation assist processing is repeatedly executed with a preset period.

Figure 4:
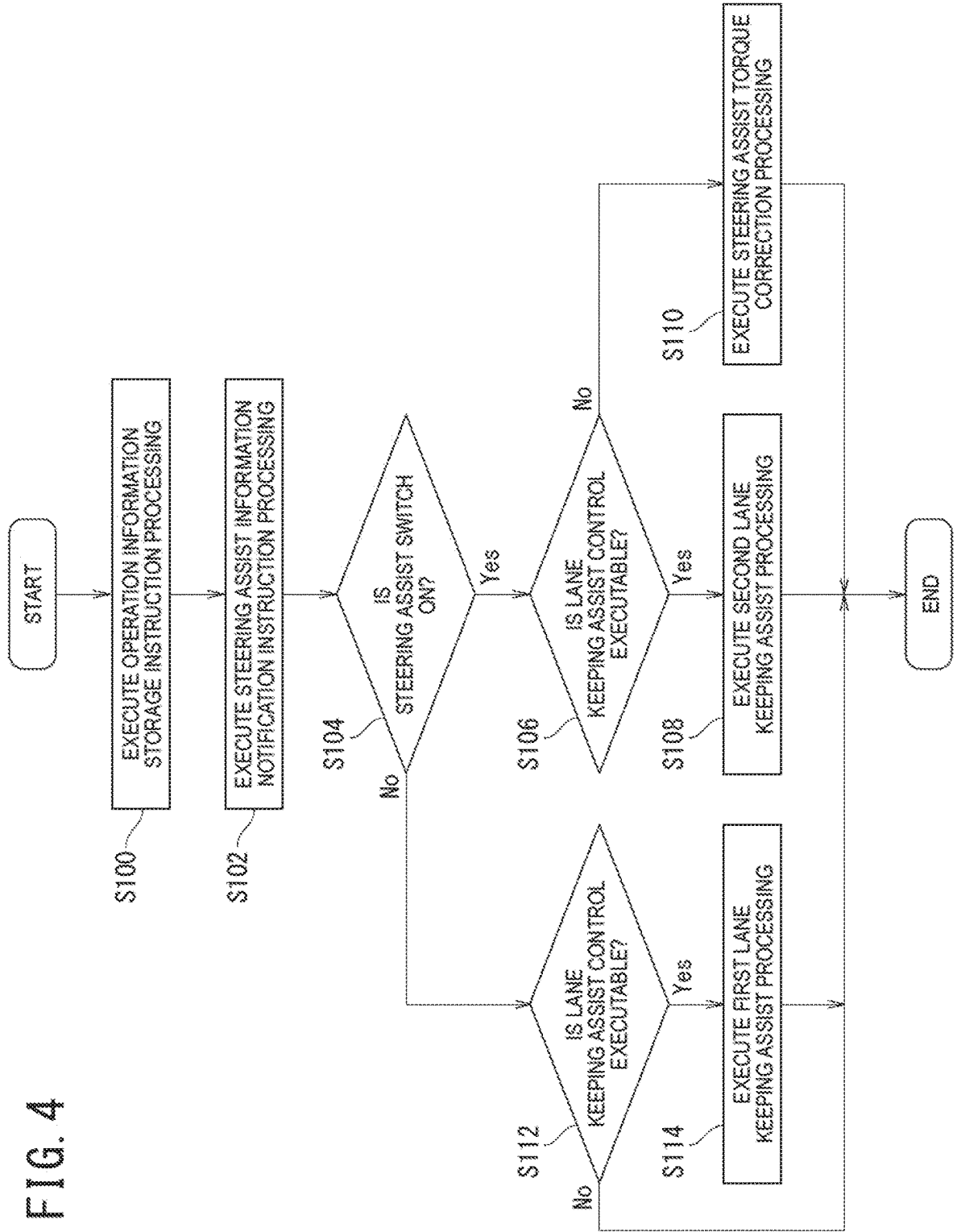
FIG. 4 is a flowchart illustrating an exemplary procedure of operation assist processing according to a first embodiment.

When the controller 14 starts operation assist processing, the process advances to step S100 first, as illustrated in FIG. 4.

In step S100, the operation information storage unit 51 executes ST operation state information storage processing, and the process advances to step S102.

In step S102, the steering assist information notification unit 52 executes steering assist information notification instruction processing, and the process advances to step S104.

In step S104, the steering AT correction unit 53 and the lane keeping assist unit 54 determine whether or not the SC steering assist switch 300 is ON, on the basis of the first switch signal SWa. If it is determined that the switch 300 is ON (Yes), the process advances to step S106; otherwise (No), the process advances to step S112.

When the process advances to step S106, the steering AT correction unit 53 and the lane keeping assist unit 54 determine whether or not lane keeping assist control is executable. More specifically, the steering AT correction unit 53 and the lane keeping assist unit 54 determine whether or not the lane keeping assist control switch is ON, on the basis of the second switch signal SWb. If it is determined that the switch is ON, it is then determined whether or not the vehicle speed Vs is a speed at which lane keeping assist control is executable. If it is determined that the switch is ON and the vehicle speed Vs is the speed at which such control is executable (Yes), the process advances to step S108; otherwise (No), the process advances to step S110.

When the process advances to step S108, the lane keeping assist unit 54 executes second lane keeping assist processing, and a series of processes is ended.

When the process advances to step S110, the steering AT correction unit 53 executes steering assist torque correction processing, and a series of processes is ended.

When it is determined in step S104 that the SC steering assist switch 300 is OFF and the process advances to step S112, the lane keeping assist unit 54 determines whether or not lane keeping assist control is executable, as in step S106. If it is determined that such control is executable (Yes), the process advances to step S114; otherwise (No), a series of processes is ended and the process returns to the original process.

When the process advances to step S114, the lane keeping assist unit 54 executes first lane keeping assist processing, and a series of processes is ended.

(ST Operation State Information Storage Instruction Processing)

ST operation state information storage instruction processing executed by the operation information storage unit 51 will be described below with reference to FIG. 5.

Figure 5:
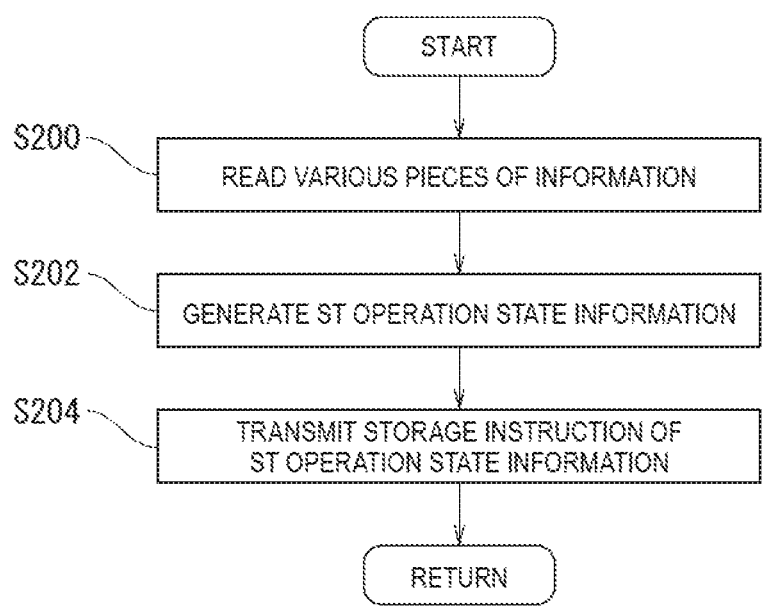
FIG. 5 is a flowchart illustrating an exemplary procedure of ST operation state information storage instruction processing according to the first embodiment.

In step S100, when ST operation state information storage instruction processing is executed, the process advances to step S200 first, as illustrated in FIG. 5.

In step S200, the operation information storage unit 51 reads various types of information including the current vehicle speed Vs, the current steering torque T, current position information, and road information corresponding to the current position, at the same timing (in synchronism with each other). The process then advances to step S202.

In step S202, the operation information storage unit 51 associates the read vehicle speed Vs, steering torque T, position information, and road information with one another to generate ST operation state information, and the process advances to step S204.

In step S204, the operation information storage unit 51 transmits a storage instruction including the ST operation state information to the navigation controller 72 via the in-vehicle network, a series of processes is ended, and the process returns to the original process.

(Steering Assist Information Notification Processing)

Steering assist information notification processing executed by the steering assist information notification unit 52 will be described below with reference to FIG. 6.

Figure 6:
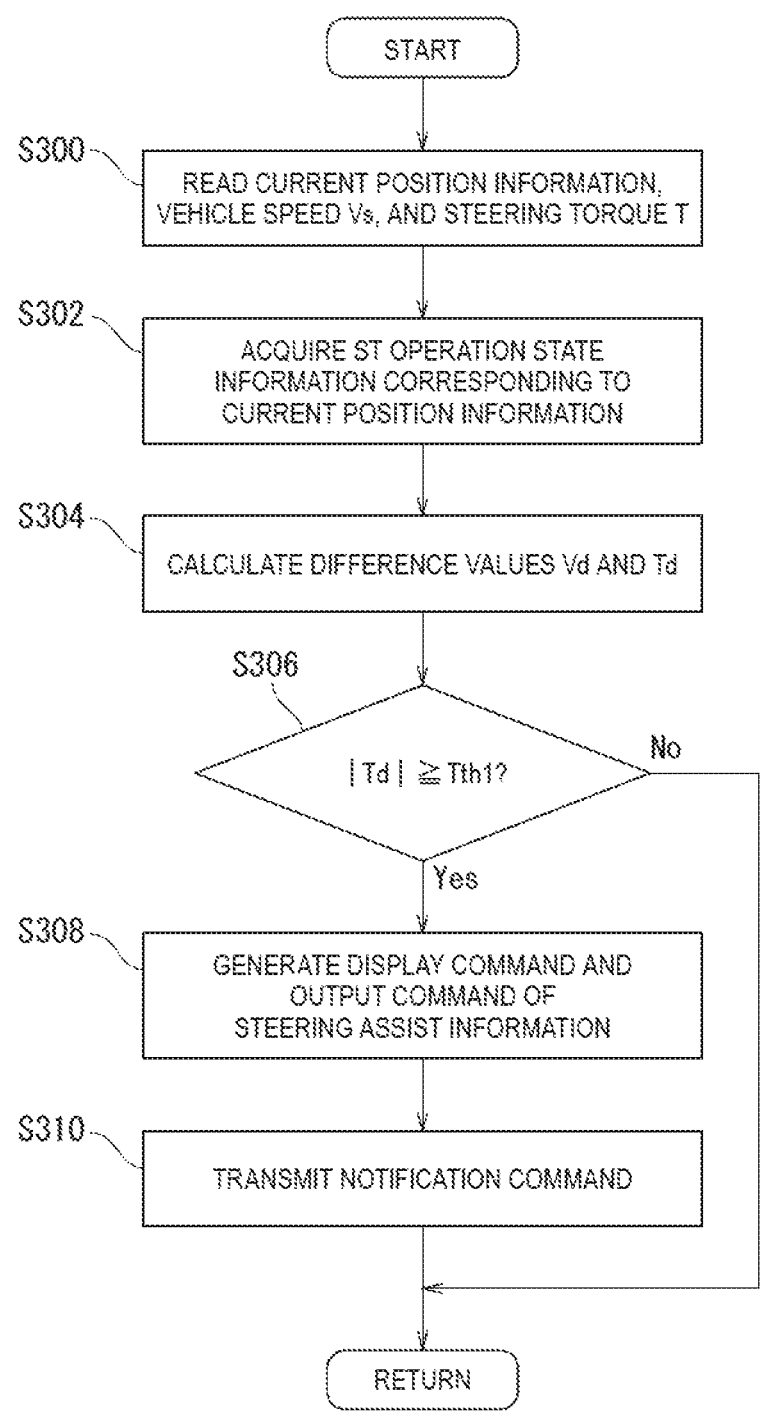
FIG. 6 is a flowchart illustrating an exemplary procedure of steering assist information notification instruction processing according to the first embodiment.

In step S102, when steering assist information notification processing is executed, the process advances to step S300 first, as illustrated in FIG. 6.

In step S300, the steering assist information notification unit 52 reads current position information, the vehicle speed Vs, and the current steering torque T at the same timing (in synchronism with each other). The process then advances to step S302.

In step S302, the steering assist information notification unit 52 transmits a request to acquire ST operation state information corresponding to the current position information to the navigation controller 72 via the in-vehicle network. The steering assist information notification unit 52 receives the ST operation state information transmitted from the navigation controller 72 via the in-vehicle network, and the process advances to step S304.

In step S304, the steering assist information notification unit 52 calculates a difference value Td between the current steering torque T read in step S300 and the past steering torque Tp included in the ST operation state information received in step S302. The steering assist information notification unit 52 stores (overwrites) the difference value Td, the current vehicle speed Vs, and the past vehicle speed Vsp included in the ST operation state information in a given area of the RAM of the controller 14, and the process advances to step S306.

In step S306, the steering assist information notification unit 52 determines whether or not the absolute value of the difference value Td (which may be simply referred to as the "difference value Td" hereinafter) is equal to or larger than a preset first torque threshold Tth1. If it is determined that the difference value Td is equal to or larger than the first torque threshold Tth1 (Yes), the process advances to step S308; otherwise (No), a series of processes is ended.

The first torque threshold Tth1 is used to determine whether or not the current steering torque T and the past steering torque Tp have a difference large to an extent to determine that the torque is too low compared to last time to go around a curve, or that the torque is too high compared to last time and thus rapid steering is caused.

When the process advances to step S308, the steering assist information notification unit 52 generates a display command of display information having contents based on road information (for example, a curved road) corresponding to the current position and the fact that the past steering torque Tp and the current steering torque T have a large difference, and an output command of a voice message or a buzzer sound corresponding to the display information. The process then advances to step S310.

In step S310, the steering assist information notification unit 52 transmits a notification command including the display command and the output command generated in step S308 to the navigation controller 72 via the in-vehicle network. Then, a series of processes is ended and the process returns to the original process.

In this way, in response to a command from the navigation controller 72, display information corresponding to the display command in the notification command is displayed on the touch panel 74, and a voice message or a buzzer sound corresponding to the output command in the notification command is output from the internal loudspeaker of the audio system 75.

(Steering AT Correction Processing)

Steering AT correction processing executed by the steering AT correction unit 53 will be described below with reference to FIG. 7.

Figure 7:
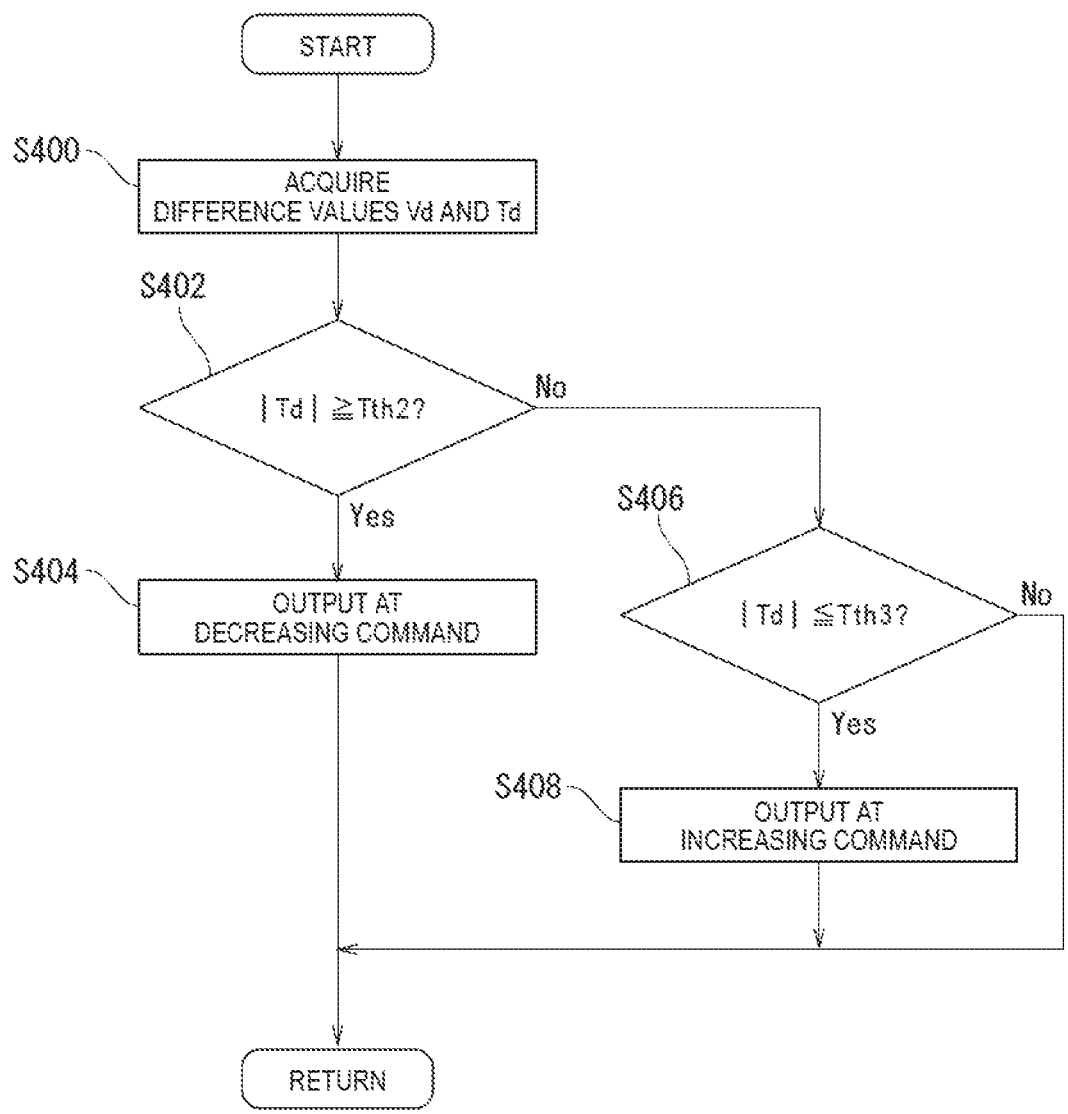
FIG. 7 is a flowchart illustrating an exemplary procedure of steering assist torque correction processing according to the first embodiment.

In step S110, when steering AT correction processing is executed, the process advances to step S400 first, as illustrated in FIG. 7.

In step S400, the steering AT correction unit 53 acquires the current vehicle speed Vs, the past vehicle speed Vsp, and the difference value Td stored in a given area of the RAM of the controller 14, and the process advances to step S402.

In step S402, the steering AT correction unit 53 determines whether or not the difference value Td acquired in step S400 is equal to or larger than a second torque threshold Tth2. If it is determined that the difference value Td is equal to or larger than the second torque threshold Tth2 (Yes), the process advances to step S404; otherwise (No), the process advances to step S406.

The second torque threshold Tth2 is used to determine whether or not the current steering torque T is higher than the past steering torque Tp to the degree that the assist torque needs to be corrected by decreasing.

When the process advances to step S404, the steering AT correction unit 53 calculates an amount of decreasing correction on the basis of the current vehicle speed Vs and the past vehicle speed Vsp. The steering AT correction unit 53 outputs an AT decreasing command including information concerning the calculated amount of decreasing correction to the current command value control unit 55, a series of processes is ended, and the process returns to the original process.

When the process advances to step S406, the steering AT correction unit 53 determines whether or not the difference value Td is equal to or smaller than a preset third torque threshold Tth3. If it is determined that the difference value Td is equal to or smaller than the third torque threshold Tth3 (Yes), the process advances to step S408; otherwise (No), the steering AT correction unit 53 outputs information indicating "without correction" to the current command value control unit 55, a series of processes is ended, and the process returns to the original process.

The third torque threshold Tth3 is used to determine whether or not the current steering torque T is lower than the past steering torque Tp to the degree that the assist torque needs to be corrected by increasing.

When the process advances to step S408, the steering AT correction unit 53 calculates an amount of increasing correction on the basis of the current vehicle speed Vs and the past vehicle speed Vsp. The steering AT correction unit 53 outputs an AT increasing command including information concerning the calculated amount of increasing correction to the current command value control unit 55, a series of processes is ended, and the process returns to the original process.

(Second Lane Keeping Assist Processing)

Second lane keeping assist processing executed by the lane keeping assist unit 54 will be described below with reference to FIG. 8.

Figure 8:
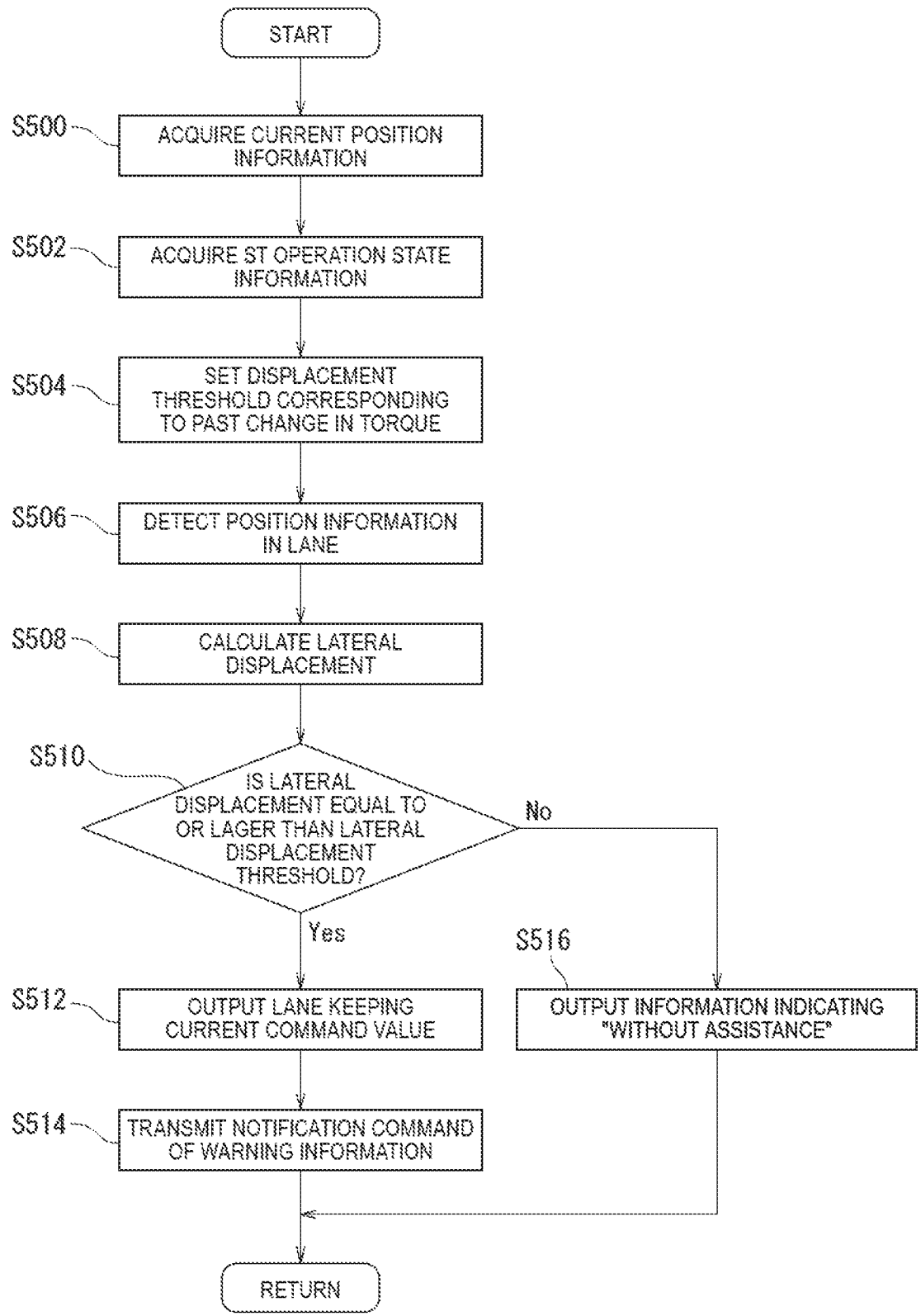
FIG. 8 is a flowchart illustrating an exemplary procedure of second lane keeping assist processing according to the first embodiment.

In step S108, when second lane keeping assist processing is executed, the process advances to step S500 first, as illustrated in FIG. 8.

In step S500, the lane keeping assist unit 54 acquires current position information, and the process advances to step S502.

In step S502, the lane keeping assist unit 54 acquires ST operation state information corresponding to the current position indicated by the current position information and the road position within a predetermined distance from the current position, and the process advances to step S504.

In step S504, a lateral displacement threshold corresponding to the magnitude of a past change in steering torque Tp is set, and the process advances to step S506.

More specifically, the lane keeping assist unit 54 estimates that a high torque has been input to avoid lane departure in the past, when the amount of past change in steering torque Tp in the right steering direction is equal to or larger than a preset right torque change threshold TthR or the amount of past change in steering torque Tp in the left steering direction is equal to or smaller than a preset left torque change threshold TthL. In this case, a threshold is set by correcting the left displacement threshold XLt or the right displacement threshold XRt to a value smaller than normal (small absolute value) to correct the left displacement or the right displacement (the displacement in the direction (direction of departure) opposite to that in which a torque is input) early. When the amounts of change in steering torque Tp in the right and left steering directions are smaller than the right torque change threshold TthR and larger than the left torque change threshold TthL, the left displacement threshold XLt and the right displacement threshold XRt are set to normal values.

In step S506, the lane keeping assist unit 54 detects position information in the travel lane in which the vehicle travels from an image of the view in front of the vehicle from the on-board camera 20, and the process advances to step S508.

In step S508, the lane keeping assist unit 54 detects a lateral displacement X from the center of the travel lane of the vehicle on the basis of the position information detected in step S506, and the process advances to step S510.

In step S510, the lane keeping assist unit 54 compares the lateral displacement X with the lateral displacement threshold set in step S504 to determine whether or not the lateral displacement X is equal to or larger than the lateral displacement threshold. If it is determined that the lateral displacement X is equal to or larger than the lateral displacement threshold (Yes), the process advances to step S512; otherwise (No), the process advances to step S516.

More specifically, the lane keeping assist unit 54 compares the right displacement XR with the right displacement threshold XRt set in step S504 to determine whether or not the right displacement XR is equal to or larger than the right displacement threshold XRt. The lane keeping assist unit 54 further compares the left displacement XL with the left displacement threshold XLt set in step S504 to determine whether or not the left displacement XL is equal to or smaller than the left displacement threshold XLt. If it is determined that the right displacement XR is equal to or larger than the right displacement threshold XRt or the left displacement XL is equal to or smaller than the left displacement threshold XLt, the process advances to step S512. If it is determined that the right displacement XR is smaller than the right displacement threshold XRt and the left displacement XL is larger than the left displacement threshold XLt, the process advances to step S516.

When the process advances to step S512, the lane keeping assist unit 54 calculates a lane keeping current command value Irefk for generating a steering assist torque in the direction to cancel out the left displacement XL or the right displacement XR. The lane keeping assist unit 54 outputs the calculated lane keeping current command value Irefk to the current command value control unit 55, and the process advances to step S514.

In step S514, the lane keeping assist unit 54 transmits a notification command including a display command of display information and an output command of a buzzer sound or a voice message notifying that the vehicle tends to depart from its lane to the navigation controller 72 via the in-vehicle network. Then, a series of processes is ended and the process returns to the original process.

When it is determined in step S510 that the lateral displacement X is smaller than the lateral displacement threshold, and the process advances to step S516, the lane keeping assist unit 54 outputs information indicating "without assistance" to the current command value control unit 55. Then, a series of processes is ended and the process returns to the original process.

(ST Operation State Information Storage Processing)

ST operation state information storage processing executed by the navigation controller 72 will be described below with reference to FIG. 9. The ST operation state information storage processing is repeatedly executed with a preset period.

Figure 9:
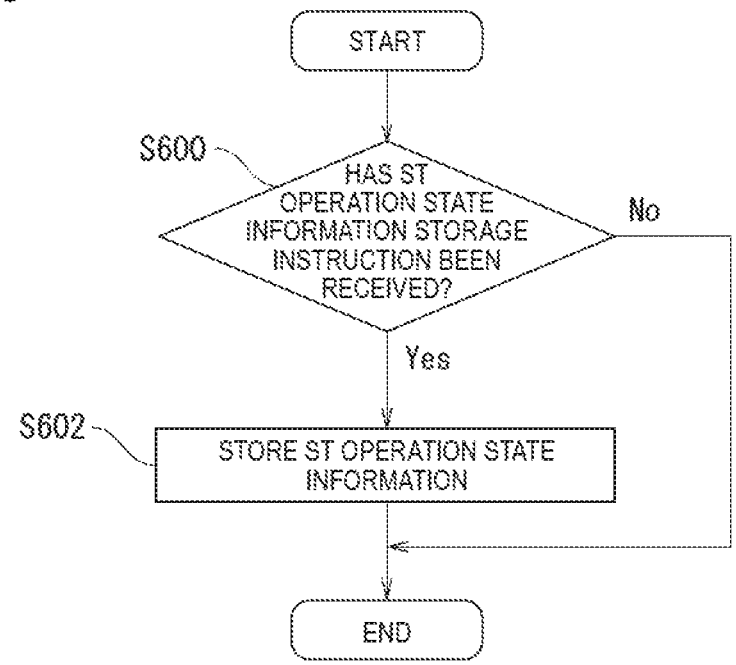
FIG. 9 is a flowchart illustrating an exemplary procedure of ST operation state information storage processing according to the first embodiment.

When the navigation controller 72 executes ST operation state information storage processing, the process advances to step S600 first, as illustrated in FIG. 9.

In step S600, the navigation controller 72 determines whether or not an ST operation state information storage instruction from the controller 14 has been received via the in-vehicle network. If it is determined that such an instruction has been received (Yes), the process advances to step S602; otherwise (No), a series of processes is ended.

When the process advances to step S602, the navigation controller 72 stores ST operation state information included in the received storage instruction in the map database 71. Then, a series of processes is ended.

(Steering Assist Information Notification Processing)

Steering assist information notification processing executed by the navigation controller 72 will be described below with reference to FIG. 10. The steering assist information notification processing is repeatedly executed with a preset period.

Figure 10:
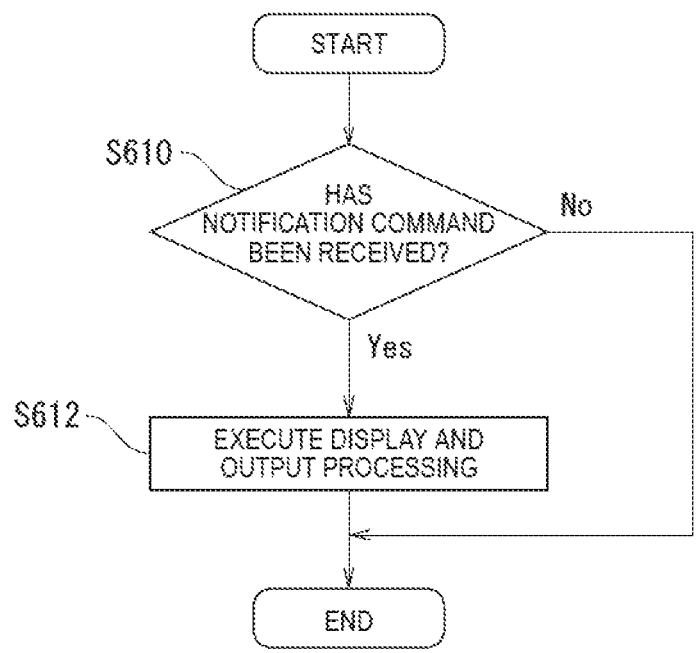
FIG. 10 is a flowchart illustrating an exemplary procedure of steering assist information notification processing according to the first embodiment.

When the navigation controller 72 executes steering assist information notification processing, the process advances to step S610 first, as illustrated in FIG. 10.

In step S610, the navigation controller 72 determines whether or not a notification command from the controller 14 has been received via the in-vehicle network. If it is determined that such a command has been received (Yes), the process advances to step S612; otherwise (No), a series of processes is ended.

When the process advances to step S612, the navigation controller 72 reads display information corresponding to a display command included in the notification command from the map database 71 and outputs an image display command in the read display information to the touch panel 74. The navigation controller 72 further outputs an audio output command of a voice message or a buzzer sound corresponding to an output command included in the notification command to the audio system 75. Then, a series of processes is ended.

In this way, display information corresponding to the display command is displayed on the touch panel 74, and a voice message or a buzzer sound corresponding to the output command is output from the internal loudspeaker of the audio system 75.

(ST Operation State Information Transmission Processing)

ST operation state information transmission processing executed by the navigation controller 72 will be described below with reference to FIG. 11. The ST operation state information transmission processing is repeatedly executed with a preset period.

Figure 11:
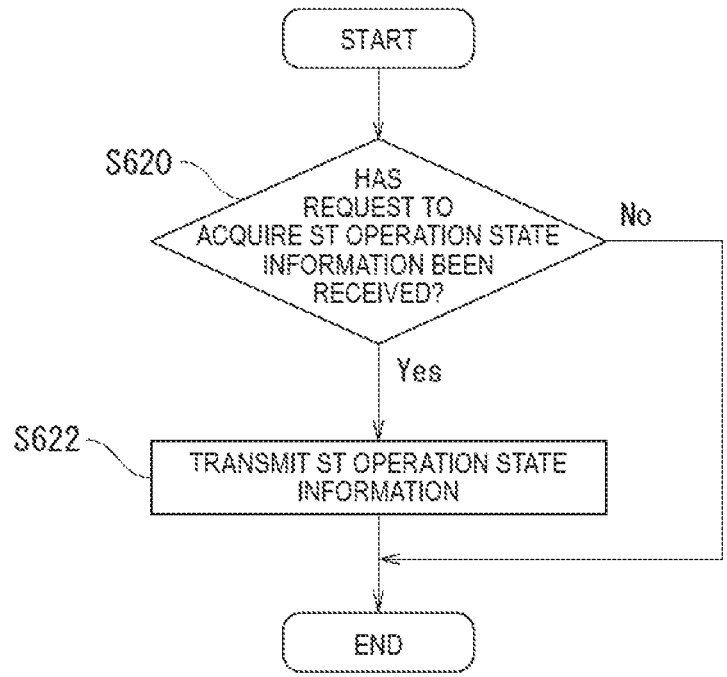
FIG. 11 is a flowchart illustrating an exemplary procedure of ST operation state information transmission processing according to the first embodiment.

When the navigation controller 72 executes ST operation state information transmission processing, the process advances to step S620 first, as illustrated in FIG. 11.

In step S620, the navigation controller 72 determines whether or not a request to acquire ST operation state information from the controller 14 has been received via the in-vehicle network. If it is determined that such a request has been received (Yes), the process advances to step S622; otherwise (No), a series of processes is ended.

When the process advances to step S622, the navigation controller 72 reads ST operation state information corresponding to position information included in the acquisition request from the map database 71. The navigation controller 72 transmits the read ST operation state information to the controller 14 via the in-vehicle network. Then, a series of processes is ended.

(Operation)

An operation in the first embodiment will be described below.

When the driver turns on an ignition switch (not illustrated), control power is supplied from the battery 15 to the controller 14, and then the controller 14 is activated. In this case, the controller 14 performs steering assist control on the basis of the steering operation by the driver.

When, for example, the driver starts the vehicle and rounds a curved road, the controller 14 calculates a steering assist command value on the basis of the steering torque T and the vehicle speed Vs and calculates a current command value Iref for the electric motor 13 on the basis of the calculated steering assist command value.

The operation information storage unit 51 acquires the current vehicle speed Vs, the current steering torque T, current position information, and road information corresponding to the current position information. The operation information storage unit 51 generates ST operation state information by associating these pieces of information with one another and transmits a storage instruction including the generated ST operation state information to the navigation controller 72 of the navigation system 19 via the in-vehicle network.

When the navigation controller 72 receives via the in-vehicle network, the storage instruction transmitted from the operation information storage unit 51, it stores the ST operation state information included in the received storage instruction in the map database 71.

Assume now that the SC steering assist switch 300 is ON and the lane keeping assist switch 302 is OFF.

Since the SC steering assist switch 300 is ON, the steering assist information notification unit 52 acquires the current vehicle speed Vs, the current steering torque T, and current position information. The steering assist information notification unit 52 transmits a request to acquire the last ST operation state information corresponding to the acquired current position information to the navigation controller 72 of the navigation system 19 via the in-vehicle network.

When the navigation controller 72 receives via the in-vehicle network, the acquisition request transmitted from the steering assist information notification unit 52, it reads the last ST operation state information corresponding to the current position information included in the received acquisition request from the map database 71. The navigation controller 72 transmits the read last ST operation state information to the controller 14 via the in-vehicle network.

When the steering assist information notification unit 52 receives via the in-vehicle network, the last ST operation state information transmitted from the navigation controller 72, it calculates a difference value Td between the last steering torque Tp included in the received last ST operation state information and the acquired current steering torque T. The steering assist information notification unit 52 stores the calculated difference value Td, the acquired current vehicle speed Vs, and the last vehicle speed Vsp included in the ST operation state information in the RAM of the controller 14. The steering assist information notification unit 52 compares the absolute value of the difference value Td with the first torque threshold Tth1 to determine whether or not the current steering torque T is largely different from the last steering torque Tp. The steering assist information notification unit 52 further determines the type of road on which the vehicle travels, on the basis of road information corresponding to the current position of the vehicle.

In this case, it is determined that the difference value Td is equal to or larger than the first torque threshold Tth1 and the current steering torque T and the last steering torque Tp have a large difference with each other. It is further determined that the vehicle travels on a curved road.

In this way, since a large difference exists during traveling on a curved road, steering AT correction processing is surely executed, and the steering assist information notification unit 52 generates, for example, a display command of a message notifying that operation assist processing has been executed and an output command of a voice message having the same contents as the former message. The steering assist information notification unit 52 transmits a notification command including the generated display command and output command to the navigation controller 72 of the navigation system 19 via the in-vehicle network.

When the navigation controller 72 receives via the in-vehicle network, the notification command transmitted from the steering assist information notification unit 52, it reads message data from the map database on the basis of the display command included in the received notification command. The navigation controller 72 outputs an image display command of a message notifying that operation assist processing has been executed because a large difference from the last steering torque exists during traveling on a curved road to the touch panel 74 on the basis of the read message data. A message indicating, for example, that "Because of a potential for failing to go around a curve, assistance worked for your safety." is displayed on the touch panel 74. Such a message is, for example, displayed in a blinked manner in red bold letters. The present invention is not limited to message display, and a picture (CG) specifying that operation assistance has worked on a curved road may be displayed.

The navigation controller 72 also reads voice message data from the map database on the basis of the output command included in the received notification command and outputs an audio output command of a voice message to the audio system 75 on the basis of the read voice message data. A voice message indicating, for example, that "Because of a potential for failing to go around a curve, assistance worked for your safety." is output from the internal loudspeaker of the audio system 75.

Since the SC steering assist switch 300 is ON, the steering AT correction unit 53 reads the current vehicle speed Vs, the last vehicle speed Vsp, and the difference value Td stored in the RAM and compares the read difference value Td with the second torque threshold Tth2 to determine whether or not the difference value Td is equal to or larger than the second torque threshold Tth2. In this case, it is determined that the current steering torque T and the last steering torque Tp have a large difference, and the difference value Td is equal to or larger than the second torque threshold Tth2.

The steering AT correction unit 53 calculates an amount of decreasing correction on the basis of the current vehicle speed Vs and the last vehicle speed Vsp and outputs an AT decreasing command including information concerning the calculated amount of decreasing correction to the current command value control unit 55.

When the current command value control unit 55 receives the AT decreasing command from the steering AT correction unit 53, it corrects by decreasing the normal current command value Iref input from the current command value calculation unit 61 to calculate a corrected current command value Irefc. A corrected current command value Irefc is calculated by, for example, correcting by decreasing the normal current command value by a preset ratio (for example, 30%).

The current command value control unit 55 outputs the calculated, corrected current command value Irefc to the subtracter 62.

The subtracter 62 calculates a current deviation between the corrected current command value Irefc input from the current command value control unit 55 and the motor current detection value (actual current value It) detected by the current detector 60 and outputs it to the current control unit 63.

The current control unit 63 performs feedback control for executing a PI (Proportional Integral) operation with respect to the current deviation and outputting a voltage command value.

In this way, a steering assist torque weaker than normal occurs.

Assume now that the lane keeping assist switch 302 is turned on and lane keeping assist control becomes executable.

Then, the lane keeping assist unit 54 executes second lane keeping assist processing, in which it acquires the current steering torque T and current position information first. The lane keeping assist unit 54 transmits to the navigation controller 72 of the navigation system 19 via the in-vehicle network, a request to acquire the last ST operation state information corresponding to the current position indicated by the acquired current position information and the position within a predetermined distance from the current position.

When the navigation controller 72 receives via the in-vehicle network, the acquisition request transmitted from the lane keeping assist unit 54, it reads from the map database 71, the last ST operation state information corresponding to the information of the current position and the position within a predetermined distance from the current position included in the received acquisition request. The navigation controller 72 transmits the read last ST operation state information within the predetermined distance to the controller 14 via the in-vehicle network.

When the lane keeping assist unit 54 receives via the in-vehicle network, the last ST operation state information within the predetermined distance transmitted from the navigation controller 72, it detects past changes in torque in the left and right steering directions on the basis of the last steering torque Tp included in the received last ST operation state information within the predetermined distance.

Assume herein that a great change in torque in the right steering direction has taken place to avoid lane departure last time. In this case, the amount of change in steering torque Tp in the right steering direction is equal to or larger than the right torque change threshold TthR, and the lane keeping assist unit 54 sets a threshold by correcting the left displacement threshold XLt to a value smaller than normal to correct the left displacement of the vehicle early.

The lane keeping assist unit 54 determines the state of the road surface from an image of the view in front of the vehicle from the on-board camera 20, detects position information in the travel lane in which the vehicle travels, and, in turn, detects a lateral displacement X from the center of the travel lane on the basis of the detected position information.

In this case, a left displacement XL is detected and compared with a left displacement threshold XLt after decreasing correction to determine whether or not the left displacement XL is equal to or larger than the left displacement threshold XLt. When it is determined that the left displacement XL is equal to or larger than the left displacement threshold XLt, a lane keeping current command value Irefk for generating a steering assist torque in the direction to cancel out the left displacement XL is calculated. The calculated lane keeping current command value Irefk is output to the current command value control unit 55.

The lane keeping assist unit 54 transmits a notification command including a display command of display information and an output command of a voice message notifying that the vehicle tends to depart from its lane to the navigation controller 72 of the navigation system 19 via the in-vehicle network.

When the current command value control unit 55 receives the lane keeping current command value Irefk from the lane keeping assist unit 54, it outputs the received lane keeping current command value Irefk to the subtracter 62 in place of the current, current command value Iref.

The subtracter 62 calculates a current deviation between the lane keeping current command value Irefk input from the current command value control unit 55 and the motor current detection value detected by the current detector 60 and outputs it to the current control unit 63.

When the navigation controller 72 receives via the in-vehicle network, the notification command transmitted from the lane keeping assist unit 54, it reads message data from the map database on the basis of the display command included in the received notification command. The navigation controller 72 outputs an image display command of a message notifying that the vehicle tends to depart from its lane to the touch panel 74 on the basis of the read message data. A message indicating, for example, that "Be careful about lane departure!" is displayed on the touch panel 74. Such a message is, for example, blinked in red bold letters.

The navigation controller 72 also reads voice message data from the map database on the basis of the output command included in the received notification command and outputs an audio output command of a voice message to the audio system 75 on the basis of the read voice message data. A voice message indicating, for example, that "Be careful about lane departure!" is output from the internal loudspeaker of the audio system 75.

The steering torque sensor 3 corresponds to a steering operation information detection unit, the GPS receiver 73 corresponds to a position information acquisition unit, the map database 71 corresponds to a storage device, the operation assist unit 23 corresponds to an operation assist unit, and the touch panel 74 corresponds to a display.

Effects of First Embodiment (1) In the electric power steering device according to the first embodiment, the current command value calculation unit 61 calculates a current command value Iref on the basis of at least a steering torque T input to the steering mechanism. The electric motor 13 generates a steering assist torque to be applied to the steering shaft 2 of the steering mechanism. The motor control unit 24 controls and drives the electric motor 13 on the basis of the current command value Iref. The steering torque sensor 3 detects the steering torque T applied to the steering wheel 1 and transmitted to the input shaft 2a. The navigation controller 72 and the GPS receiver 73 acquire position information of a vehicle equipped with the electric power steering device. The operation information storage unit 51 stores in the map database 71, ST operation state information obtained by associating the steering torque T detected by the steering torque sensor 3 and the position information upon detection of the steering torque T with each other. The operation assist unit 23 executes operation assist processing for assisting the driver in operating the steering wheel 1 on the basis of past ST operation state information which is stored by the operation information storage unit 51 and corresponds to the current position information.

With this configuration, the position information of the vehicle and the steering torque T can be stored in association with each other to aid the driver in the current operation of the steering wheel 1 on the basis of the stored past steering torque T. This can provide appropriate steering assistance to the driver by actively performing operation assistance by the electric power steering device.

(2) The ST operation state information is defined as information including the vehicle speed upon detection of the steering torque T and road information corresponding to position information upon detection of the steering torque T.

With this configuration, the steering torque T can be stored in association with the information concerning the road on which the vehicle travels. This allows appropriate steering assistance according to road information such as the shape of the road (for example, the curvature of a curve) or the type of road (for example, an expressway) on which the vehicle travels. Further, since the current and last speeds of entry into a curved road can be compared with each other based on the information of the vehicle speed, when the speed of entry is higher than last time, display of a warning message and steering assistance can be performed to more reliably improve the safety.

(3) The operation assist unit 23 executes operation assist processing for displaying on the display (touch panel 74), information indicating the current operation state based on the past steering torque Tp corresponding to the current position information.

With this configuration, comparative information (for example, stronger (or rapid steering) or weaker than the past) of the current steering torque T with the past steering torque Tp can be displayed. This allows the driver to know the past steering state from the displayed information to control the current steering in accordance with the perceived past steering state. This can improve the safety of steering.

(4) The operation assist unit 23 executes operation assist processing for correcting the current command value Iref on the basis of the difference information Td between the current steering torque T detected by the steering torque sensor 3 and the past steering torque Tp.

With this configuration, a steering assist torque generated by the electric motor 13 can be controlled on the basis of the difference information Td between the current steering torque T and the past steering torque Tp during traveling on the same road as in the past. This can improve the safety and comfort of steering.

(5) The operation assist unit 23 corrects the current command value to a value which sets the steering assist torque to be lower than normal when the difference value Td between the current and past steering torques is equal to or larger than a preset second torque threshold Tth2, and corrects the current command value Iref to a value which sets the steering assist torque to be higher than normal when the difference value Td is equal to or smaller than a preset third torque threshold Tth3 which is smaller than the second torque threshold Tth2.

With this configuration, when, for example, the current steering torque T is far higher or lower than the past steering torque Tp, the current command value Iref can be corrected by decreasing or increasing. This allows assistance to the driver in steering with reference to the past steering torque Tp to improve the safety and comfort of steering.

(6) The operation assist unit 23 executes operation assist processing for generating in an electric motor, a steering assist torque to assist in steering in the direction to correct the lateral offset with respect to the travel lane of the vehicle on the basis of the past steering torque Tp and image information of the view in front of the vehicle including lane markings.

With this configuration, operation assist processing can be executed for correcting by decreasing the threshold or the like for the amount of offset in correcting the offset, on the basis of a past change in steering torque Tp corresponding to position information of the vehicle, or the like, to start assistance in correcting the offset earlier, or the like. This can improve the safety and comfort of steering for lane departure of the vehicle or the like.

Second Embodiment (Configuration)

An electric power steering device according to the second embodiment is different from that according to the first embodiment in terms of the processing contents of a steering assist information notification unit 52. Other configurations are the same as those in the electric power steering device according to the first embodiment.

Since features different from those in the first embodiment will be described in detail below, the same reference numerals denote the same constituent parts, and a description thereof will be omitted as appropriate.

The steering assist information notification unit 52 in the second embodiment acquires past (last) ST operation state information corresponding to the road position at a predetermined distance ahead of the current position. The steering assist information notification unit 52 generates a display command to display steering assist information based on the last ST operation state information for the road on which the vehicle is to run on a touch panel 74, and an output command of a voice message notifying the steering assist information, on the basis of the acquired last ST operation state information. The steering assist information notification unit 52 transmits a notification command including the display command and the output command to a navigation controller 72 of a navigation system 19 via an in-vehicle network.

More specifically, the steering assist information notification unit 52 in the second embodiment is configured to issue a notification instruction of steering assist information based not only on the road information and the last steering torque Tp included in the ST operation state information, but also on the last vehicle speed Vsp.

With this arrangement, the navigation controller 72 causes the touch panel 74 to display, display information such as a message or a picture indicating steering assist information based on the road information, the last steering torque Tp, and the vehicle speed Vsp included in the ST operation state information. The navigation controller 72 also causes the audio system 75 to output a voice message indicating steering assist information based on the last steering torque Tp and the vehicle speed Vsp.

(Steering Assist Information Notification Instruction Processing)

Steering assist information notification instruction processing executed by the steering assist information notification unit 52 in the second embodiment will be described below with reference to FIG. 12.

Figure 12:
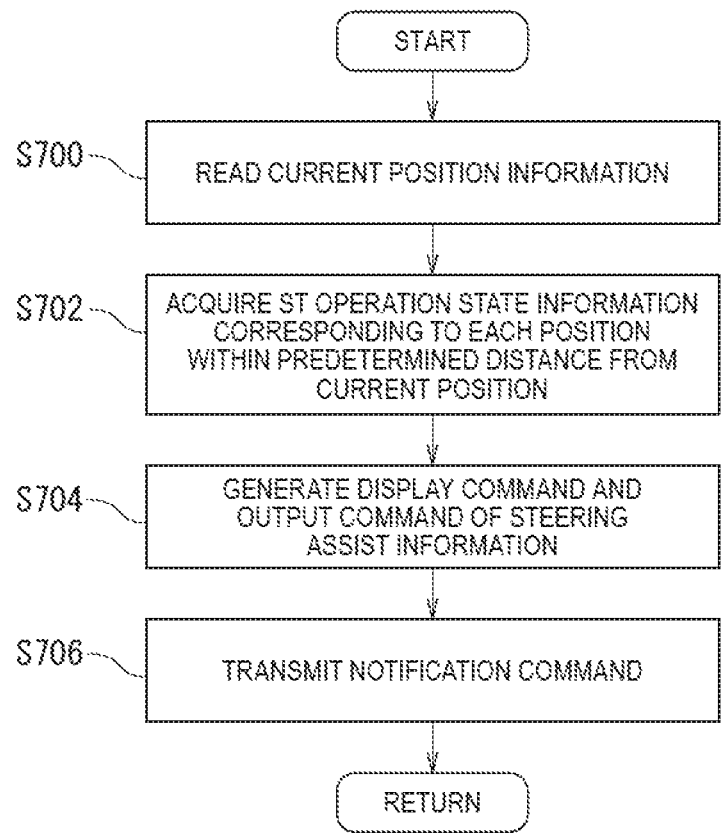
FIG. 12 is a flowchart illustrating an exemplary procedure of steering assist information notification instruction processing according to a second embodiment.

In step S102, when steering assist information notification instruction processing is executed, the process advances to step S700 first, as illustrated in FIG. 12.

In step S700, the steering assist information notification unit 52 reads current position information. The process then advances to step S702.

In step S702, the steering assist information notification unit 52 transmits a request to acquire the last ST operation state information corresponding to the position at a predetermined distance ahead of the current position indicated by the current position information to the navigation controller 72 via the in-vehicle network. The steering assist information notification unit 52 receives the ST operation state information transmitted from the navigation controller 72 via the in-vehicle network, and the process advances to step S704.

In step S704, the steering assist information notification unit 52 generates a display command of steering assist information based on information concerning the road on which the vehicle is to run, the last steering torque Tp, and the vehicle speed Vsp, and an output command of a voice message corresponding to the steering assist information. The process then advances to step S706.

In step S706, the steering assist information notification unit 52 transmits a notification command including the display command and the output command generated in step S704 to the navigation controller 72 via the in-vehicle network. Then, a series of processes is ended and the process returns to the original process.

In this way, in response to a command from the navigation controller 72, display information corresponding to the display command in the notification command is displayed on the touch panel 74, and a voice message or a buzzer sound corresponding to the output command in the notification command is output from the internal loudspeaker of the audio system 75.

(Operation)

When the steering assist information notification unit 52 determines that an SC steering assist switch 300 is ON, it acquires current position information first. The steering assist information notification unit 52 transmits a request to acquire the last ST operation state information corresponding to the position at a predetermined distance ahead of the current position indicated by the acquired current position information to the navigation controller 72 of the navigation system 19 via the in-vehicle network.

When the navigation controller 72 receives via the in-vehicle network, the acquisition request transmitted from the steering assist information notification unit 52, it reads from a map database 71, the last ST operation state information corresponding to the information of the position at the predetermined distance ahead included in the received acquisition request. The navigation controller 72 transmits the read last ST operation state information to the controller 14 via the in-vehicle network.

The steering assist information notification unit 52 receives via the in-vehicle network, the last ST operation state information corresponding to the position at the predetermined distance ahead transmitted from the navigation controller 72. The steering assist information notification unit 52 generates a display command of a message indicating steering assist information based on the last steering torque Tp and the last vehicle speed Vsp for the road on which the vehicle is to run, on the basis of the road information, the last steering torque Tp, and the last vehicle speed Vsp included in the received last ST operation state information. The steering assist information notification unit 52 also generates an output command of a voice message corresponding to steering assist information based on the last steering torque Tp and the last vehicle speed Vsp and transmits a notification command including the generated display command and output command to the navigation controller 72 of the navigation system 19 via the in-vehicle network.

When the navigation controller 72 receives via the in-vehicle network, the notification command transmitted from the steering assist information notification unit 52, it reads message data from the map database on the basis of the display command included in the received notification command. The navigation controller 72 outputs an image display command of a message indicating the last steering state to the touch panel 74 on the basis of the read message data.

In this way, when, for example, the vehicle is about to enter a curve, a message indicating steering assistance based on the input state of the steering torque Tp during traveling in the same curve as in last time is displayed on the touch panel 74. A message indicating, for example, that "Last time an entry into the curve involved excessive torque input." is displayed. A message indicating steering assistance based on the vehicle speed Vsp during traveling in the same curve as in last time is also displayed on the touch panel 74. When, for example, the current vehicle speed Vs is higher than the last vehicle speed Vsp, a message indicating, for example, that "Your speed of entry into the curve is too high!" or "Caution: your speed of entry into the curve is higher than last time." is displayed.

The navigation controller 72 also reads voice message data from the map database on the basis of the output command included in the received notification command and outputs an audio output command of a voice message to the audio system 75 on the basis of the read voice message data. A voice message related to steering assist information is output from the internal loudspeaker of the audio system 75. A voice message corresponding to steering assist information such as "Beware of rapid steering when you enter the curve!" or "Your speed of entry into the curve is too high!" is output.

The steering torque sensor 3 corresponds to a steering operation information detection unit, the GPS receiver 73 corresponds to a position information acquisition unit, the map database 71 corresponds to a storage device, the operation assist unit 23 corresponds to an operation assist unit, and the touch panel 74 corresponds to a display.

Effects of Second Embodiment

The second embodiment has the following effects, in addition to the effects of the first embodiment.

(1) The operation assist unit 23 executes operation assist processing for displaying, in advance, information concerning operation assistance for the road on which the vehicle is to run, on the touch panel 74 on the basis of past steering operation information corresponding to the position ahead of the current position of the vehicle.

With this configuration, the driver can know, in advance, information concerning steering assistance based on the past steering torque Tp for the road on which the vehicle is to run. When, for example, a relatively high torque like rapid steering has been input in the past, the driver can perceive this fact in advance to steer while taking care to avoid rapid steering, or the like. This can improve the safety of steering.

In the second embodiment, notification of additional steering assist information based on the past vehicle speed Vsp allows control for issuing warning information when, for example, the speed of entry into the curve is too high, steering assist control for ensuring safety, and the like. This can improve the safety of steering.

The use of information concerning on-board direction indicators (winkers) allows determination that the vehicle is to turn for example, in order to turn right or left at an intersection and, in turn, allows more appropriate steering assistance.

Third Embodiment (Configuration)

An electric power steering device according to the third embodiment is partially different from that according to the first embodiment in terms of the processing contents of a lane keeping assist unit 54. Other configurations are the same as those in the electric power steering device according to the first embodiment.

Since features different from those in the first embodiment will be described in detail below, the same reference numerals denote the same constituent parts, and a description thereof will be omitted as appropriate.

The lane keeping assist unit 54 in the third embodiment is different in terms of executing third lane keeping assist processing in place of the second lane keeping assist processing in the first embodiment. Second lane keeping assist processing and third lane keeping assist processing may be switched using, for example, a switch.

In third lane keeping assist processing, first, a steering torque T input from a steering torque sensor 3 and current position information of the vehicle are acquired. Then, past ST operation state information corresponding to the current position and the road position within a predetermined distance from the current position, stored in a map database 71, is acquired from a navigation controller 72. The past travel path of the vehicle is estimated on the basis of past steering torques Tp at a plurality of positions included in the acquired ST operation state information within the predetermined distance. Consistency is evaluated between the current steering torque T and the estimated travel path on the basis of the current steering torque T and vehicle speed Vs, the past steering torque Tp and vehicle speed Vsp, and the estimated travel path, and steering assistance is performed to correct the inconsistency, if any.

In the third embodiment, the strength of steering assistance (strong, weak, or zero) can be set via a switch (not illustrated) or the navigation controller 72. The lane keeping assist unit 54 in the third embodiment is configured to execute steering assist processing according to the set strength as third lane keeping assist processing.

More specifically, when the strength of steering assistance is set "weak," if inconsistency with the past travel path exists, the lane keeping assist unit 54 in the third embodiment calculates a lane keeping current command value Irefkw for generating a relatively low steering assist torque in the direction to cancel out the inconsistency (the displacement with respect to the past travel path). The lane keeping assist unit 54 outputs the calculated lane keeping current command value Irefkw to a current command value control unit 55. When the strength of steering assistance is set to "strong," if inconsistency with the past travel path exists, the lane keeping assist unit 54 calculates a lane keeping current command value Irefks for generating a relatively high steering assist torque in the direction to cancel out the inconsistency. The lane keeping assist unit 54 outputs the calculated lane keeping current command value Irefks to the current command value control unit 55.

When the strength of steering assistance is set to "zero," the lane keeping assist unit 54 does not perform steering assistance even in the presence of inconsistency.

that is, in the third embodiment, a relatively low steering assist torque is generated in the direction to come close to the past travel path when "weak" is set, and a relatively high steering assist torque is generated to make the vehicle trace the past travel path (for example, adjust the displacement with respect to the past travel path to be zero) when "strong" is set.

(Third Lane Keeping Assist Processing)

Third lane keeping assist processing executed by the lane keeping assist unit 54 will be described below with reference to FIG. 13.

Figure 13:
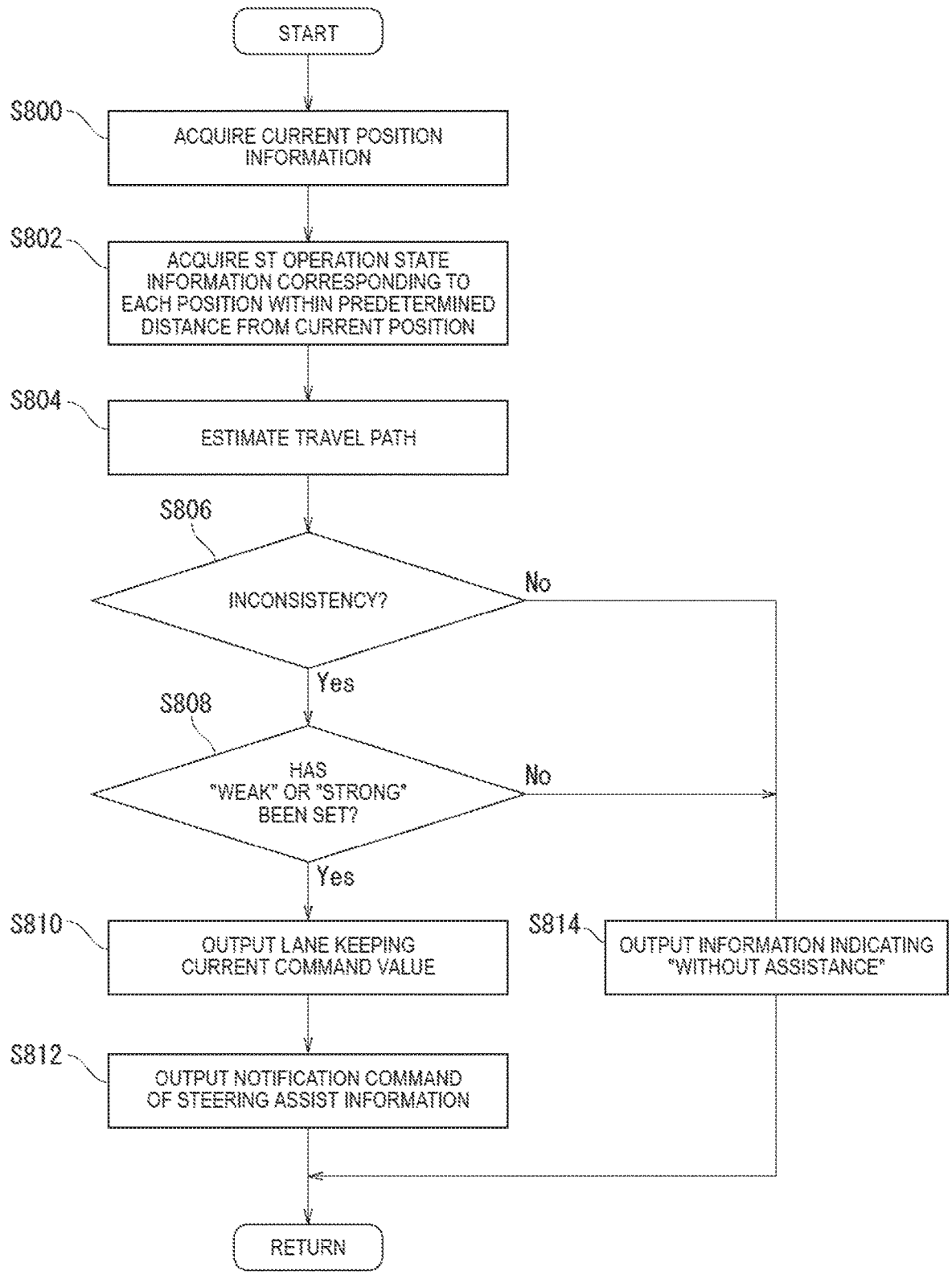
FIG. 13 is a flowchart illustrating an exemplary procedure of third lane keeping assist processing according to a third embodiment.

In step S108, when third lane keeping assist processing is executed, the process advances to step S800 first, as illustrated in FIG. 13.

In step S800, the lane keeping assist unit 54 acquires current position information, and the process advances to step S802.

In step S802, the lane keeping assist unit 54 acquires ST operation state information corresponding to the current position indicated by the current position information and the road position within a predetermined distance from the current position, and the process advances to step S804.

In step S804, the lane keeping assist unit 54 estimates the past travel path of the vehicle on the basis of the past steering torque Tp, and the process advances to step S806.

In step S806, the lane keeping assist unit 54 determines whether or not the current steering torque T and the estimated travel path have inconsistency, on the basis of the current steering torque T and vehicle speed Vs, the past steering torque T and vehicle speed Vsp, and the estimated travel path. If it is determined that inconsistency exists (Yes), the process advances to step S808; otherwise (No), the process advances to step S812.

More specifically, a displacement is calculated in consideration of the difference in vehicle speed of the current vehicle traveling position with respect to the past travel path, and it is determined that inconsistency exists when the calculated displacement is equal to or larger than a displacement threshold and that no inconsistency exists when the calculated displacement is smaller than the displacement threshold.

In step S808, the lane keeping assist unit 54 determines whether or not the strength of steering assistance has been set to "weak" or "strong." If it is determined that "weak" or "strong" has been set (Yes), the process advances to step S810; otherwise (No), the process advances to step S814.

When the process advances to step S810, if the strength of steering assistance has been set to "weak," the lane keeping assist unit 54 calculates a lane keeping current command value Irefkw for generating a relatively low steering assist torque in the direction to cancel out the inconsistency (displacement). The lane keeping assist unit 54 outputs the calculated lane keeping current command value Irefkw to the current command value control unit 55. If the strength of steering assistance has been set to "strong," the lane keeping assist unit 54 calculates a lane keeping current command value Irefks for generating a relatively high steering assist torque in the direction to cancel out the inconsistency (displacement). The lane keeping assist unit 54 outputs the calculated lane keeping current command value Irefks to the current command value control unit 55. The process then advances to step S812.

In step S812, the lane keeping assist unit 54 transmits a notification command including a display command of display information and an output command of a voice message notifying that steering assistance has worked with "weak" or "strong" to the navigation controller 72 via an in-vehicle network. Then, a series of processes is ended and the process returns to the original process.

When it is determined in step S806 that no inconsistency exists or it is determined in step S808 that neither "weak"

nor "strong" has been set, and the process advances to step S814, the lane keeping assist unit 54 outputs information indicating "without assistance" to the current command value control unit 55. Then, a series of processes is ended and the process returns to the original process.

(Operation)

Assume now that an SC steering assist switch 300 and a lane keeping assist switch 302 are turned on and lane keeping assist control becomes executable.

Then, the lane keeping assist unit 54 executes third lane keeping assist processing, in which it acquires the current steering torque T and current position information first. The lane keeping assist unit 54 transmits to the navigation controller 72 of a navigation system 19 via the in-vehicle network, a request to acquire the last ST operation state information corresponding to the current position indicated by the acquired current position information and the position within a predetermined distance from the current position.

When the navigation controller 72 receives via the in-vehicle network, the acquisition request transmitted from the lane keeping assist unit 54, it reads from the map database 71, the last ST operation state information corresponding to the information of the current position and the position within a predetermined distance from the current position included in the received acquisition request. The navigation controller 72 transmits the read last ST operation state information within the predetermined distance to a controller 14 via the in-vehicle network.

When the lane keeping assist unit 54 receives via the in-vehicle network, the last ST operation state information within the predetermined distance transmitted from the navigation controller 72, it estimates the past travel path of the vehicle on the basis of the last steering torque Tp included in the received last ST operation state information within the predetermined distance.

The lane keeping assist unit 54 calculates a displacement in consideration of the difference in vehicle speed of the current vehicle traveling position with respect to the estimated travel path, on the basis of the estimated travel path, the current steering torque T and vehicle speed Vs, and the past steering torque Tp and vehicle speed Vsp, and determines whether or not the calculated displacement is equal to or larger than a displacement threshold. It is thus determined whether or not the current steering torque T and the estimated travel path have inconsistency.

On a curved road, when, for example, the current vehicle speed Vs is equal to the past vehicle speed Vsp and the current steering torque T is equal to the past steering torque Tp, the current vehicle traveling position is identical to the corresponding position in the estimated past travel path. It is therefore determined that no inconsistency exists as the displacement is smaller than the displacement threshold. When, for example, the current vehicle speed Vs is equal to the past vehicle speed Vsp and the current steering torque T is different from the past steering torque Tp, the current vehicle traveling position is different from the corresponding position is the estimated past travel path (being displaced). It is therefore determined that inconsistency exists when the displacement is equal to or larger than the displacement threshold.

Assume herein that it is determined that inconsistency exists and the strength of steering assistance has been set to "strong." In this case, the lane keeping assist unit 54 calculates a lane keeping current command value Irefks for generating a relatively high steering assist torque in the direction to cancel out the displacement from the estimated travel path. The lane keeping assist unit 54 outputs the calculated lane keeping current command value Irefks to the current command value control unit 55. The lane keeping assist unit 54 transmits a notification command including a display command of display information and an output command of a voice message for notifying that steering assistance works with strength "strong" to the navigation controller 72 via the in-vehicle network.

When the current command value control unit 55 receives the lane keeping current command value Irefks from the lane keeping assist unit 54, it outputs the received lane keeping current command value Irefks to the subtracter 62 in place of the current, current command value Iref.

The subtracter 62 calculates a current deviation between the lane keeping current command value Irefks input from the current command value control unit 55 and the motor current detection value detected by the current detector 60 and outputs it to a current control unit 63.

In this way, a driving current for generating a relatively high steering assist torque in the direction to cancel out the displacement is output from the current control unit 63 to a motor driving unit 65.

When the navigation controller 72 receives via the in-vehicle network, the notification command transmitted from the current command value control unit 55, it reads message data from the map database on the basis of the display command included in the received notification command. The navigation controller 72 outputs an image display command of a message notifying that steering assistance works with strength "strong" to the touch panel 74 on the basis of the read message data.

The navigation controller 72 also reads voice message data from the map database on the basis of the output command included in the received notification command and outputs an audio output command of a voice message to the audio system 75 on the basis of the read voice message data. A voice message indicating that steering assistance works with strength "strong" is output from the internal loudspeaker of the audio system 75.

The steering torque sensor 3 corresponds to a steering operation information detection unit, the GPS receiver 73 corresponds to a position information acquisition unit, the map database 71 corresponds to a storage device, the operation assist unit 23 corresponds to an operation assist unit, and the touch panel 74 corresponds to a display.

A steering torque Ts corresponds to information concerning the travel path.

Effects of Third Embodiment

The third embodiment has the following effects, in addition to the effects of the first and second embodiments.

(1) The ST operation state information includes information (in this case, the steering torque Ts) concerning the travel path of the vehicle corresponding to position information upon detection of steering operation information. The lane keeping assist unit 54 executes operation assist processing for generating in the electric motor, a steering assist torque for assisting in steering in the direction to cancel out the current displacement with respect to the past travel path, on the basis of the current steering operation information and information concerning the travel path and the past steering operation information and information concerning the travel path.

With this configuration, steering assistance can be performed such that the vehicle follows a path close to the past travel path or traces the past travel path. This can facilitate traveling in a path close to the past travel path.

Especially when a travel path is estimated on the basis of past steering torques Tp at a plurality of positions, the need for information concerning lane markings (white lines) can be obviated so that a travel path can be obtained even for a road having faded or no white lines.

Information concerning a travel path held in the navigation system 19 may be used instead of or in addition to a pseudo travel path using the past steering torque Tp.

(Modifications)

(1) In each of the above-described embodiments, although the controller 14 executes lane keeping assist processing, the present invention is not limited to this configuration, and a controller for lane keeping assistance may be separately provided. Alternatively, other configuration may be used, such as a configuration provided with an image processing function added to the on-board camera 20, which performs calculation of a displacement X and the preceding processing involved.

(2) In each of the above-described embodiments, although operation assist processing is executed regardless of the road shape or the type of road, the present invention is not limited to this configuration. For example, a configuration in which operation assist processing is executed only during traveling on a road having a specific road shape or type of road may be used, such as a configuration in which the operation assist processing is executed only for curved roads by accumulating information concerning only the curved roads.

(3) In each of the above-described embodiments, although a steering torque T is detected as steering operation information, the present invention is not limited to this configuration. For example, a steering angular velocity may be detected instead of or in addition to a steering torque T. In this case, a steering angle θs detected by the steering angle sensor 18 is input to the controller 14, as illustrated in FIG. 1, and, for example, the steering angle θs is differentiated to detect a steering angular velocity ωs in the operation assist unit 23 of the controller 14, as illustrated in FIG. 2. When, for example, the past steering angular velocity ωp is higher than the current steering angular velocity ωs, the current command value Iref is corrected by decreasing to set the steering assist torque to be lower than normal. Alternatively, when the past steering angular velocity cop is lower than the current steering angular velocity ωs, the current command value Iref is corrected by increasing to set the steering assist torque higher.

(4) In each of the above-described embodiments, although two pieces of past ST steering state information are stored and held in the map database 71, the present invention is not limited to this configuration, and three or more pieces of past ST operation state information may be stored and held. With this configuration, for example, safer past operation information (for example, a past steering torque Tp) can be generated by learning from three or more pieces of past ST steering state information, and operation assist processing such as steering assist information notification instruction processing and steering AT correction processing can be executed on the basis of the generated past operation information.

(5) In each of the above-described embodiments, although a difference value Td between the current steering torque T and the last steering torque Tp is calculated or the like in operation assist processing based on the values of such current and last steering torques, the present invention is not limited to this configuration. For example, other configurations may be used, such as a configuration in which the operation assist processing is conducted on the basis of the current steering torque T and the statistical value such as the average of past steering torques Tp stored in the map database 71.

(6) In each of the above-described embodiments, although the lane keeping assist unit 54 detects a great change in torque from the past steering torque Tp in second lane keeping assist processing, the present invention is not limited to this configuration. For example, other configurations may be used, such as a configuration in which the state in which a torque is continuously input in one direction (the state in which fine steering continues in the direction of departure) is detected.

(7) In each of the above-described embodiments, although ST operation state information is stored in the map database 71 of the navigation system 19, the present invention is not limited to this configuration. For example, such information may be stored in a storage device mounted in the electric power steering device or stored in a storage device mounted in an external server. When such information is stored in an external server, a long-distance wireless communication device (for example, a device which uses a base station for mobile phones) is separately provided.

(8) In each of the above-described embodiments, although display information is displayed on the touch panel 74 of the navigation system 19 on the basis of the notification command transmitted from the steering assist information notification unit 52, the present invention is not limited to this configuration. For example, other configurations may be used, such as a configuration in which such information is displayed on a display provided in the meter panel of the vehicle.

(9) In each of the above-described embodiments, although both display processing of steering assist information and control processing of the steering assist torque (current command value Iref) are executed as operation assist processing, the present invention is not limited to this configuration. For example, either one of these types of processing may be executed, or in accordance with the magnitude of the difference value Td, only display processing may be executed when the difference value Td is relatively small while only control processing of the steering assist torque or both types of processing may be executed when the difference value Td is relatively large.

(10) In the first embodiment, in steering assist information notification instruction processing and steering AT correction processing, although only ST operation state information corresponding to the current position information is acquired and each type of processing is executed on the basis of the acquired ST operation state information, the present invention is not limited to this configuration. For example, ST operation state information within a predetermined distance from the current position may be acquired in advance with a predetermined period and stored and held in the RAM of the controller 14 to acquire ST operation state information corresponding to the current position information from this RAM. With this configuration, delay can be considerably reduced in acquiring ST operation state information corresponding to the current position information.

(11) In the first embodiment, in steering assist information notification instruction processing and steering AT correction processing, although only ST operation state information corresponding to the current position information is acquired, and each type of processing is executed on the basis of the acquired ST operation state information, the present invention is not limited to this configuration. For example, the navigation controller 72 may transmit ST operation state information corresponding to the current position to the controller 14 with a preset period, and the controller 14 may acquire the periodically transmitted ST operation state information at the same timing. With this configuration, delay can be considerably reduced in acquiring ST operation state information corresponding to the current position information.

(12) In the second embodiment, in steering assist information notification instruction processing, one piece of ST operation state information corresponding to the position at a predetermined distance ahead of the current position is acquired, and an instruction is issued for notification processing of steering assist information for the road on which the vehicle is to run, on the basis of the acquired ST operation state information. The present invention is not limited to this configuration, and, for example, pieces of ST operation state information within a predetermined distance from the current position may be acquired, and an instruction may be issued for notification processing of steering assist information for the road on which the vehicle is to run, on the basis of the pieces of acquired ST operation state information.

(13) In each of the above-described embodiments, although an example in which the present invention is applied to a column-assist electric power steering device has been given, the present invention is not limited to this configuration, and, for example, the present invention may be applied to a rack- or pinion-assist electric power steering device.

This application claims priority based on Japanese Patent Application No. 2015-118504 (filed on Jun. 11, 2015), the contents of which are incorporated by reference herein in its entirety.

While the present invention has been described herein with reference to only a limited number of embodiments, the scope of claims is not limited thereto, and modifications to each embodiment based on the aforementioned disclosure will be apparent to those skilled in the art.

REFERENCE SIGNS LIST

1 Steering wheel
2 Steering shaft
3 Steering torque sensor
8 Steering gear
10 Steering assist mechanism
13 Electric motor
14 Controller
15 Battery
17 Vehicle speed sensor
21 Command value calculation unit
22 Command value compensation unit
23 Operation assist unit
24 Motor control unit
31 Steering assist command value calculation unit
32 Phase compensation unit
33 Torque differentiating circuit
41 Angular velocity calculation unit
42 Angular acceleration calculation unit
43 Convergence compensation unit
44 Inertia compensation unit
45 SAT estimation feedback unit
46-48 Adder
51 Operation information storage unit
52 Steering assist information notification unit
53 Steering assist torque correction unit
54 Lane keeping assist unit
55 Current command value control unit
61 Current command value calculation unit
62 Subtracter
63 Current control unit
65 Motor driving unit
300 SC steering assist switch

The invention claimed is:

1. An electric power steering device comprising:
a steering wheel;
a steering shaft connected to the steering wheel;
an electric motor connected to the steering shaft and configured to apply a steering assist force to the steering shaft;
a torque sensor configured to detect a steering torque transmitted to the steering shaft;
a position detector configured to acquire a position of a vehicle equipped with the electric power steering device;
a database in which a past steering torque detected by the torque sensor and a past position of the vehicle at a time when the past steering torque is detected are stored in correspondence with each other; and
a controller configured to:
calculate a current command value based on the steering torque;
output a driving current for driving the electric motor based on the current command value;
acquire a current steering torque from the torque sensor;
acquire a current position of the vehicle from the position detector;
read out, from the database, the past steering torque stored in correspondence with the past position wherein the past position is the same as the current position; and
assist operating of steering the steering wheel by a driver based on the current steering torque and the past steering torque read out from the database.

2. The electric power steering device according to claim 1, wherein the controller is further configured to:
calculate a difference between the current steering torque and the past steering torque read out from the database; and
assist operating of the steering the steering wheel by the driver such that the difference becomes smaller.

3. The electric power steering device according to claim 1, wherein road information corresponding to the past position when the past steering torque is detected is stored in the database in correspondence with the past steering torque.

4. The electric power steering device according to claim 1, wherein the controller is further configured to display comparative information of the current steering torque with the past steering torque on a display.

5. The electric power steering device according to claim 1, wherein the controller is further configured to:
read out, from the database, a second past steering torque stored in correspondence with a second past position wherein the second past position is the same as a position ahead of the current position; and
display information concerning operation assistance for a road on which the vehicle is to run, on a display based on the second past steering torque.

6. The electric power steering device according to claim 1, wherein the controller is further configured to:
correct the current command value to a value which sets the steering assist force to be lower than normal when a difference between the current steering torque and the past steering torque is not less than a preset first threshold; and correct the current command value to a value which sets the steering assist force to be higher than normal when the difference is not more than a preset second threshold smaller than the preset first threshold.

7. The electric power steering device according to claim 1, wherein the controller is further configured to assist the operating of steering the steering wheel by the driver in a direction to correct a lateral displacement with respect to a travel lane of the vehicle, based on image information of a view in front of the vehicle including a lane marking and the past steering torque.

* * * * *